(12) United States Patent
Lehoux et al.

(10) Patent No.: US 9,573,084 B2
(45) Date of Patent: *Feb. 21, 2017

(54) TWIN SCREW EXTRUDER PRESS FOR SOLID/FLUID SEPARATION

(71) Applicant: GREENFIELD SPECIALTY ALCOHOLS INC., Toronto (CA)

(72) Inventors: Richard Romeo Lehoux, Windsor (CA); Christopher Bruce Bradt, LaSalle (CA)

(73) Assignee: GreenField Specialty Alcohols Inc., Toronto (CA)

( * ) Notice: Subject to any disclaimer, the term of this patent is extended or adjusted under 35 U.S.C. 154(b) by 444 days.

This patent is subject to a terminal disclaimer.

(21) Appl. No.: 13/857,655

(22) Filed: Apr. 5, 2013

(65) Prior Publication Data

US 2013/0264264 A1    Oct. 10, 2013

Related U.S. Application Data

(60) Provisional application No. 61/620,772, filed on Apr. 5, 2012.

(51) Int. Cl.
  *B01D 29/46* (2006.01)
  *B01D 29/82* (2006.01)
  (Continued)

(52) U.S. Cl.
  CPC ............ *B01D 33/009* (2013.01); *B01D 29/46* (2013.01); *B01D 29/828* (2013.01); *B30B 1/00* (2013.01);
  (Continued)

(58) Field of Classification Search
  None
  See application file for complete search history.

(56) References Cited

U.S. PATENT DOCUMENTS 1,722,814 A    7/1929   Meakin
3,141,845 A    7/1964   Nadherny
(Continued)

FOREIGN PATENT DOCUMENTS

CA    1070646 A    1/1980
CA    1127552      7/1982
(Continued)

OTHER PUBLICATIONS

U.S. Appl. No. 13/292,449, Office Action dated Sep. 9, 2013.
(Continued)

*Primary Examiner* — Benjamin Kurtz
(74) *Attorney, Agent, or Firm* — Borden Ladner Gervals LLP

(57) ABSTRACT

Disclosed is a solid/liquid separation apparatus including an extruder press combined with a solid/fluid separation module for separating fluid from a mass of solids compressed by the extruder at elevated pressures. The extruder includes two or more extruder screws with flighting intercalated at least along a part of the extruder barrel. The separation module forms a continuation of the barrel, receives the pressurized mass and at least a portion of the twin screws, and includes a filter pack consisting of a filter plate and a backer plate. The filter plate has a throughgoing filter slot extending away from a core opening and into the filter plate for directing fluid away from the core opening. The backer plate has a core opening shaped and sized equal to the barrel and defines a passage for guiding fluid collected in the filter slot to an exterior of the filter pack.

26 Claims, 16 Drawing Sheets

(51) Int. Cl.

| | | |
|---|---|---|
| *B30B 1/00* | (2006.01) | |
| *B30B 9/12* | (2006.01) | |
| *B30B 9/16* | (2006.01) | |
| *B30B 9/24* | (2006.01) | |
| *B30B 9/26* | (2006.01) | |
| *B01D 33/00* | (2006.01) | |
| *B30B 11/24* | (2006.01) | |

(52) U.S. Cl.
CPC . *B30B 9/12* (2013.01); *B30B 9/16* (2013.01); *B30B 9/26* (2013.01); *B30B 11/24* (2013.01)

(56) References Cited

U.S. PATENT DOCUMENTS

| | | | |
|---|---|---|---|
| 3,230,865 A * | 1/1966 | Franz et al. | 100/37 |
| 3,807,298 A | 4/1974 | Luke et al. | |
| 4,003,304 A | 1/1977 | Reinhall | |
| 4,340,184 A * | 7/1982 | Poss | 241/82.3 |
| 4,446,788 A | 5/1984 | Molnar | |
| 5,034,124 A | 7/1991 | Kopf | |
| 5,100,551 A | 3/1992 | Pall et al. | |
| 5,333,556 A | 8/1994 | Isobe et al. | |
| 5,417,155 A | 5/1995 | Tatsuzawa et al. | |
| 5,515,776 A | 5/1996 | Scheucher et al. | |
| 7,191,700 B2 | 3/2007 | Sasaki | |
| 7,347,140 B2 | 3/2008 | Scheucher et al. | |
| 7,357,074 B2 | 4/2008 | Kraft et al. | |
| 8,746,138 B2 * | 6/2014 | Lehoux et al. | 100/128 |
| 2005/0199559 A1 | 9/2005 | Duby | |
| 2005/0252845 A1 | 11/2005 | Kemmelmeyer | |
| 2006/0037905 A1 | 2/2006 | Sasaki | |
| 2006/0288884 A1 * | 12/2006 | Babbini | 100/146 |
| 2009/0293742 A1 | 12/2009 | Murphy et al. | |
| 2010/0269990 A1 | 10/2010 | Dottori et al. | |
| 2010/0313882 A1 | 12/2010 | Dottori et al. | |
| 2012/0118517 A1 | 5/2012 | Lehoux et al. | |
| 2014/0110324 A1 * | 4/2014 | Lehoux et al. | 210/231 |

FOREIGN PATENT DOCUMENTS

| | | |
|---|---|---|
| CA | 2022884 A | 12/1989 |
| CA | 2701407 A1 | 10/2010 |
| CN | 201454229 | 5/2010 |
| CN | 102527128 | 7/2012 |
| CN | 202289634 | 7/2012 |
| DE | 102004037350 B3 | 4/2006 |
| EP | 0358837 A1 | 3/1990 |
| GB | 2005555 A | 4/1979 |
| GB | 2306132 A | 4/1997 |
| GE | AP1996631 A | 6/1996 |
| JP | 58153509 | 9/1983 |
| JP | S59218298 A | 12/1984 |
| JP | H01224199 A | 9/1989 |
| JP | 11253709 | 9/1999 |
| JP | 2006055699 A1 | 3/2006 |
| JP | 2013545599 A | 12/2013 |
| SU | 1346051 A3 | 10/1987 |
| WO | 90/14878 A1 | 12/1990 |
| WO | 9213710 | 8/1992 |
| WO | 02/14598 A1 | 2/2002 |
| WO | 2011/102691 A2 | 8/2011 |
| WO | 2013033770 A1 | 3/2013 |
| WO | 2013/045091 A1 | 4/2013 |
| WO | 2013/183285 A1 | 12/2013 |

OTHER PUBLICATIONS

International Patent Application No. PCT/CA2011/050695, Search Report dated Jan. 17, 2012.
International Patent Application No. PCT/CA2013/050279, Search Report dated Jun. 14, 2013.
Colombian Patent Application Serial No. 13-135295, English translation of Office Action dated Jul. 3, 2014, 7 pages.
International Patent Application No. PCT/CA2014/051132, Search Report and Written Opinion dated Feb. 11, 2015.
International Application No. PCT/CA2015/050491, International Search Report and Written Opinion dated Aug. 18, 2015.
International Application No. PCT/CA2015/050463, International Search Report and Written Opinion dated Aug. 19, 2015.
Georgian Application No. AP 2013 013600, Search Report dated Aug. 7, 2015.
Georgian Application No. AP 2013 013600, Documentary Conclusion dated Aug. 20, 2015.
U.S. Appl. No. 13/292,449, Office Action dated Jan. 27, 2014.
U.S. Appl. No. 13/292,449, Notice of Allowance dated Apr. 7, 2014.
European Patent Application No. 13772219.5; EESR dated Mar. 17, 2016.
Russian Federation Patent Application No. 2013123644/05; Decision to Grant dated Jun. 28, 2016 (English Translation.
Office Action dated Oct. 25, 2016 issued on the corresponding Japanese application No. 2015-503721. English translation available.
Supplementary Examination Report dated Nov. 10, 2016 issued on Singaporean patent application No. 11201406102Y.
International Preliminary Report on Patentability for Application No. PCT/CA2015/050463 mailed Dec. 1, 2016.
European Application No. 11839592.0, Extended European Service Report dated Dec. 16, 2016.
International Patent Application No. PCT/CA2015/050491, International Preliminary Report on Patentability dated Dec. 15, 2016.

\* cited by examiner

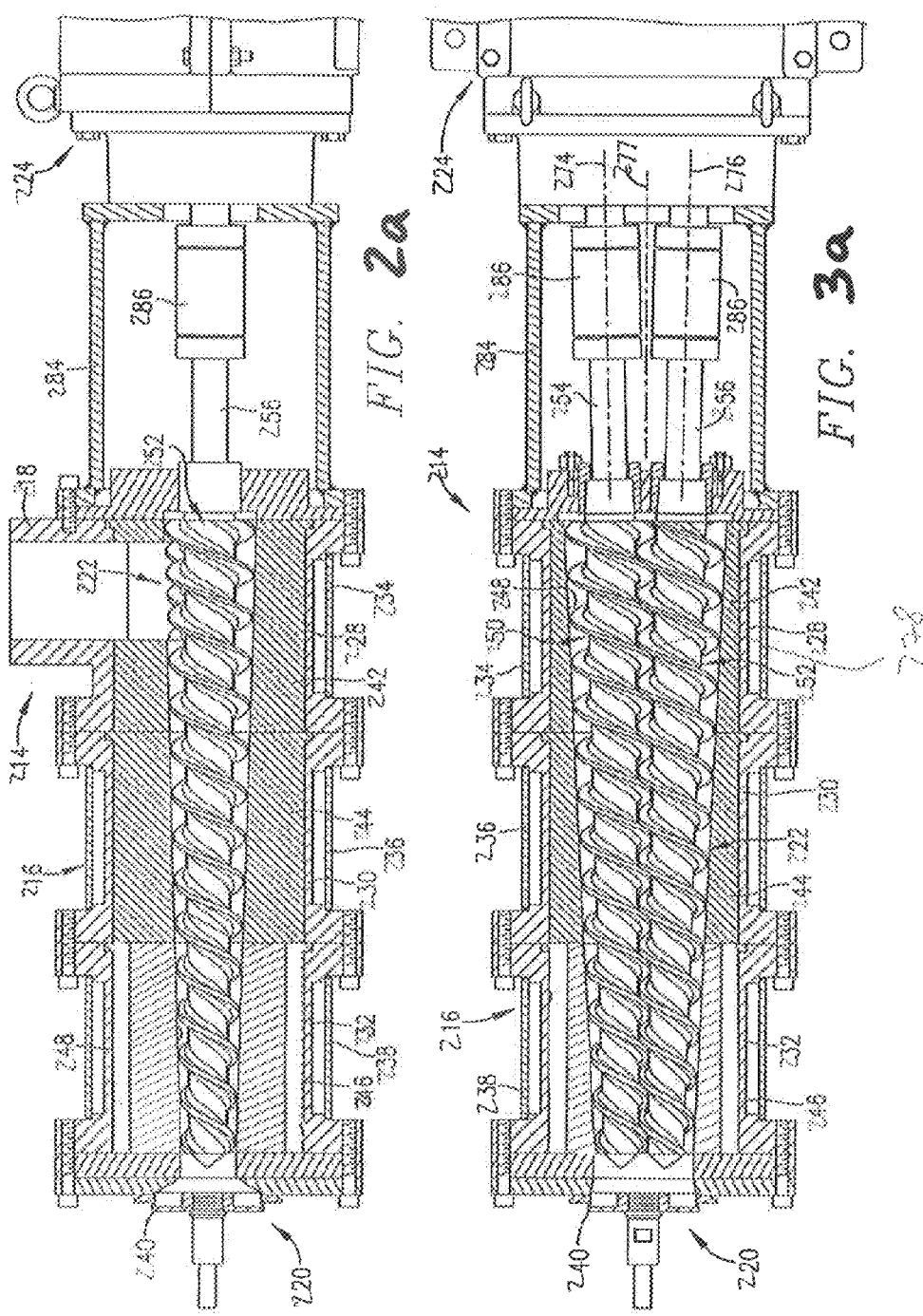

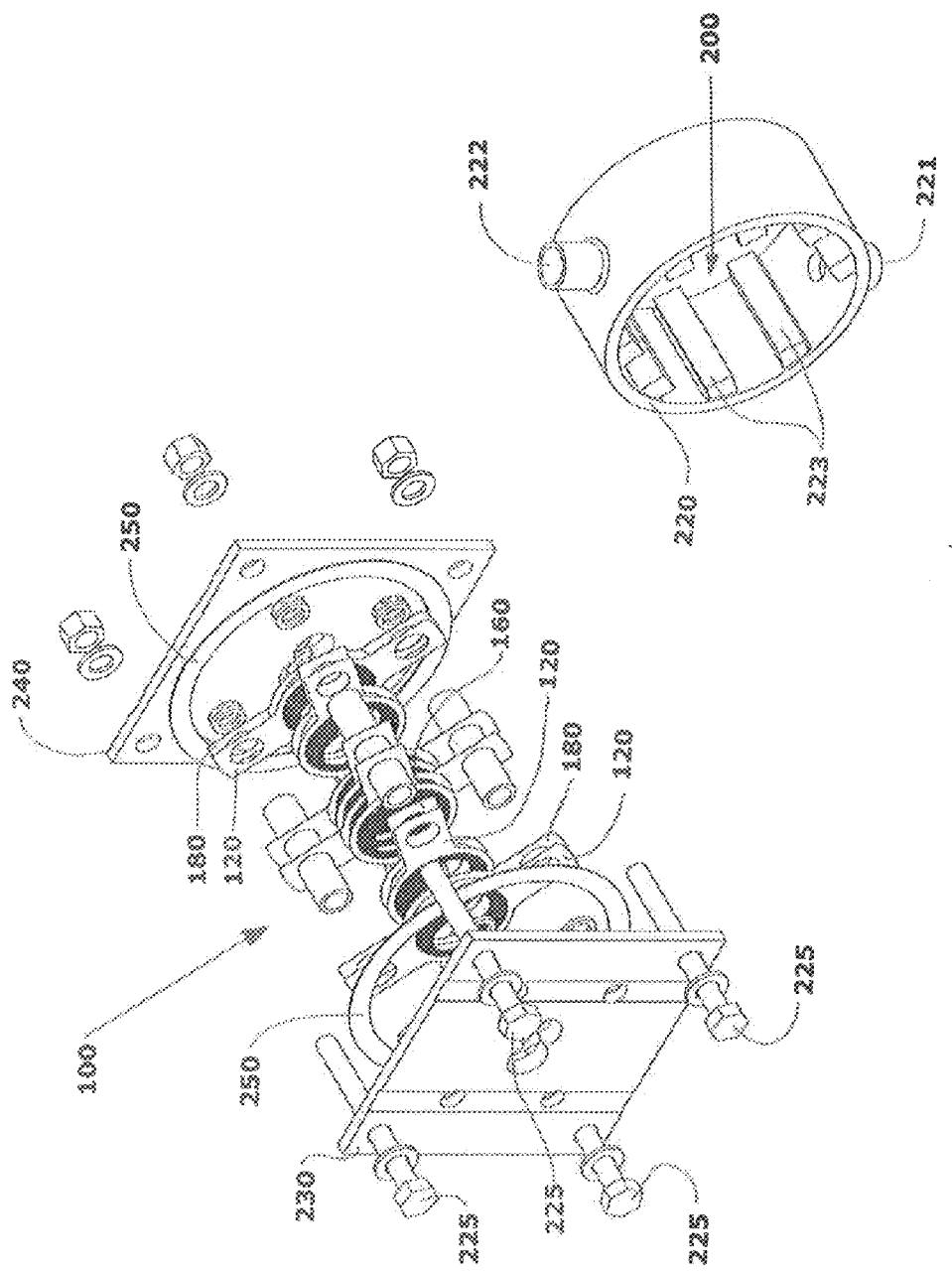

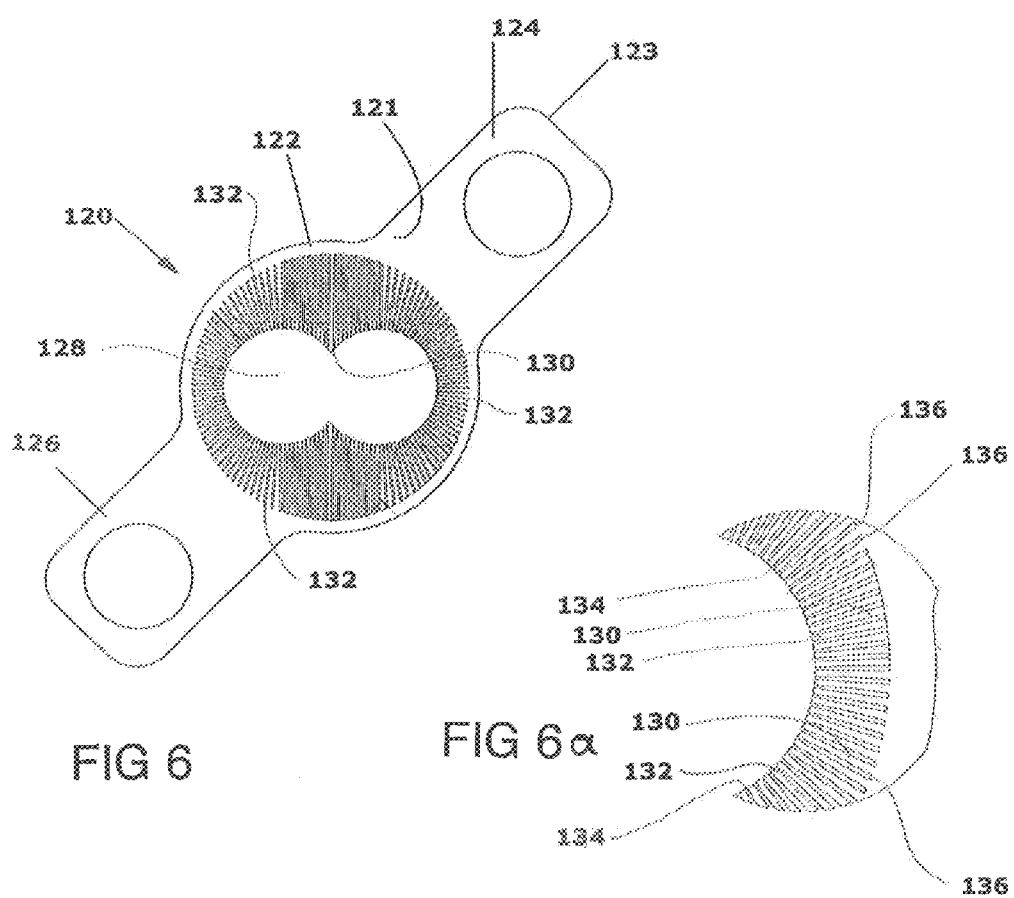

TWIN SCREW EXTRUDER PRESS FOR SOLID/FLUID SEPARATION

CROSS REFERENCE TO RELATED APPLICATIONS

This application claims the benefit of priority of U.S. Provisional Patent Application No. 61/620,772 filed Apr. 5, 2012, the contents of which are incorporated herein by reference.

FIELD OF THE INVENTION

The present invention relates to a method for the treatment of different types of solid/fluid mixtures. The present invention is broadly concerned with solid/fluid separation apparatus, in particular improved screw press devices of a highly versatile nature which can be used for the separation of a wide variety of liquid/solid mixtures and slurries of varying densities, solids contents and types of solids and liquids.

BACKGROUND OF THE INVENTION

Various process feed or process residue treatment processes for solid/liquid separation are known which require significant residence time, high pressure and high temperature. Generally, liquids must be separated from treated solids at those conditions. Conventional liquid/solid separation equipment is not satisfactory for the achievement of high liquids/solids separation rates and solids with low liquid content.

For example, in the pretreatment of lignocellulosic biomass, hydrolyzed hemicellulose sugars, toxins, inhibitors and/or other extractives must be squeezed from the solid biomass/cellulose fraction. It is difficult to effectively separate solids from liquid under the high heat and pressure required for cellulose pre-treatment.

Many biomass to ethanol processes generate a wet fiber slurry from which dissolved compounds and liquid must be separated at various process steps to isolate a solid fibrous portion. Solid/liquid separation is generally done by filtration and either in batch operation, with filter presses, or continuously by way of screw presses.

Solid/liquid separation is also necessary in many other commercial processes, such as food processing (oil extraction), reduction of waste stream volume in wet extraction processes, dewatering processes, suspended solids removal.

Commercial screw presses can be used to remove moisture from a solid/liquid slurry. However, the remaining de-liquefied solids cake generally contains only 40-50% solids. This level of separation may be satisfactory when the filtration step is followed by another dilution or treatment step, but not when maximum dewatering of the slurry is desired, the leftover moisture being predominantly water. This unsatisfactory low solids content is due to the relatively low maximum pressure conventional screw presses can handle, which is generally not more than about 100-150 psig of separation pressure. Commercial Modular Screw Devices (MSD's) combined with drainer screws can be used, which can run at higher pressures of up to 300 psi. However, their drawbacks are their inherent cost, complexity and continued filter cake limitation of no more than 50% solids content.

During solid/fluid separation, the amount of liquid remaining in the solids fraction (solids cake) is dependent on the amount of separating pressure applied, the thickness of the solids cake, and the porosity of the filter. The porosity of the filter is dependent on the number and size of the filter pores. A reduction in pressure, an increase in cake thickness or a decrease in porosity of the filter, will all lower the separation efficiency and result in a decrease in the degree of liquid/solid separation and in the ultimate degree of dryness of the solids fraction.

For a particular solids cake thickness and filter porosity, maximum separation is achieved at the highest separating pressure possible. For a particular solids cake thickness and separating pressure, maximum separation is dependent solely on the pore size of the filter.

High separating pressures unfortunately require strong filter media, which are able to withstand the separating pressure, making the process difficult and the required equipment very costly. When high separating pressures are required, the thickness of the filter media needs to be increased to withstand those pressures. However, to maintain the same overall porosity as a filter with the thinner filter media, thicker filter media require a larger pore size. This may create a problem, depending on the solids to be retained, since the acceptable pore size of the filter is limited by the size of the fibers and particles in the solids fraction, the clarity of the liquid fraction being limited solely by the pore size of the filter media. Pores that are too large allow a significant amount of suspended particles to collect in the liquid fraction, thereby reducing the liquid/solid separation efficiency. A higher porosity can also be achieved by providing a higher overall number of pores, but that either weakens the filter media and thus lowers the maximum operating pressure, or unduly enlarges the filter surface.

In order to achieve an acceptable balance between separation efficiency and filter size, conventional solid/liquid separation equipment is generally operated at less than desirable pressures and larger than desirable pore diameters. However, over time, that leads to the filter media becoming plugged with suspended solids, thereby not only reducing the separation efficiency, but eventually leading to failure of the filter. This is especially the case at the high pressures required for cellulose pre-treatment. Thus, a backwash flow of liquid is normally required to clear a blockage of the filter and restore the separation rate. Once a filter becomes plugged, it takes high pressure to backwash the filter media. This is particularly problematic when working with filter media operating at elevated pressures, for example above 1000 psig, or with a process that is to be continuous.

Conventional single, twin, or triple screw presses are known, but have unacceptable separating capabilities. U.S. Pat. No. 7,347,140 discloses a screw press with a perforated casing. Operating pressures of such a screw press are low, due to the low strength of the perforated casing and the relatively low porosity of the casing. U.S. Pat. No. 5,515,776 discloses a worm press and drainage perforations in the press jacket, which increase in cross-sectional area in flow direction of the drained liquid. U.S. Pat. No. 7,357,074 is directed to a screw press with a conical dewatering housing with a plurality of perforations for the drainage of water from bulk solids compressed in the press. Again, a perforated casing or jacket is used. As will be readily understood, the higher the number of perforations in the housing, the lower the pressure resistance of the housing. Moreover, drilling perforations in a housing or press jacket is associated with serious challenges when very small apertures are desired for the separation of fine solids. Thus, an improved filter media or dewatering module for a screw press is desired.

SUMMARY OF THE INVENTION

It is an object of the present invention to obviate or mitigate at least one disadvantage of previous solid/liquid separation devices.

It is a further object to provide an improved method for the de-liquifying of various different solid/liquid slurries obtained and/or processed in different applications.

It is yet another object of the invention to provide an improved device and method for the separation of a large variety of different types of solid/liquid mixtures and slurries.

It is still a further aspect of the invention to provide an improved device and method for separating both liquids and gases from solid/liquid slurries.

In order to improve solids/fluid separation, the invention provides a high pressure filter apparatus including a twin screw extruder press combined with a solid/fluid separation module for separating fluid from a fluid containing mass of solids compressed by the twin screw extruder at pressures above 100 psig, preferably above 300 psig. For maximum throughput, the filter apparatus is preferably a twin screw extruder press, but triple screw extruder presses can also be used with the separation module in accordance with the invention.

According to conventional knowledge, the filtering efficiency of a filter press can be improved by increasing filtering pressure and filter porosity. However, conventionally used filtering media significantly limit the pressures and porosity achievable. The inventors, have now surprisingly discovered that the filtering efficiency of a screw press including the separation module in accordance with this disclosure can be improved not only by manipulating the filtering conditions and the filtering properties of the module, but can be significantly improved by replacing the screw type conveying unit, with a screw extruder press with two or more extruder screws with intercalated flighting. By using a twin screw extruder to compress and convey the slurry, significantly higher solids contents in the filter cake can be achieved than in conventional screw presses, when operating at the same filtering pressures and filter porosity. At the same time, the inventors discovered that significantly higher separation pressures and, thus, much higher solids contents in the filter cake, can be achieved by combining a twin-screw extruder press with a high pressure solid/liquid separation unit capable of operating at separation pressures above 300 psig and up to 20,000 psig. In one application, the dewatering of pretreated cellulosic biomass in a biomass to ethanol process, solids contents far above 50% are expected. Without being bound by this theory, the inventors believe that the improved filtering capacity of a press including a twin-screw extruder is caused by the significant shear produced in a multiple screw extruder, such as a twin screw extruder. It is theorized that the higher shear achieved, forces entrapped liquid from the solids in the slurry, which liquid would otherwise not be separable by pressure alone. This shear is expected to significantly contribute to an improved solid/liquid separation with any solid/liquid mixture or slurry in which at least part of the liquid is bound to or entrapped by the solids.

Twin screw extruders are known and are generally used in plastics processing and food processing (extrusion cooking), but have not been used as in the present invention for solid/liquid separation under elevated pressure.

The preferred extruder unit of the solid/liquid separation apparatus of the invention includes a twin screw assembly having a barrel which houses at least a pair of parallel or non-parallel screws with at least partially intercalated flighting. The flighting of the screws is intercalated at least along a part of the length of the extruder barrel to define a close clearance between the pair of screws and between the screws and the barrel. Cylindrical, tapered, or conical screws can be used. Tapered, conical screws can be used as well as non-parallel conical screws with a tapered core. The close clearance creates nip areas with increased shear. The nip areas create high pressure zones within the barrel which propel material forwardly, while the material is kneaded and sheared.

The preferred extruder further includes a specialized fluid separation module, which allows fluids to be efficiently extracted from the extruded mixture at the elevated operating pressures of a screw extruder.

This assembly is expected to provide significant benefits to diverse processes, where liquid needs to be separated from solids, and the liquid has to have low suspended solids contamination. The assembly is also expected to be advantageous for processes wherein solids need to be separated from liquid where the liquids contain dissolved compounds that need to be removed through washing or elution and the liquid extracted must have a low suspended solids contamination.

The separation capacity of a twin screw extruder filter press in accordance with the present disclosure can be improved by using a filter unit with improved separation properties as disclosed in co-pending US application US2012-0118517 (U.S. Ser. No. 13/292,449), which is incorporated herein in its entirety. The separation module includes a filter unit having a porosity of 5% to 40% (total pore area relative to the total filter surface). Preferably, the module withstands operating pressures of up to 20,000 psig, more preferably 10,000 psig, most preferably 3000 psig at a filter porosity of 5 to 40%, more preferably 11 to 40%. The filter unit preferably includes a plurality of filter pores with a pore size of 0.00005 to 0.005 square inch.

The inventors of the present application have further surprisingly discovered that the same basic construction of an extruder with two or more extruder screws and a separation module in accordance with a filter unit as described above can be used, without clogging of the separation module, for the separation of liquids from very diverse liquid/solid mixtures and slurries previously not separable by the same principle device or method.

In a preferred embodiment, the filter unit includes filter pores having a pore size of 0.00005 square inch for the separation of fine solids, a porosity of 5.7% and a pressure resistance of 2,500 psig. In another embodiment, the filter unit includes pores having a pore size of 0.005 square inch and a porosity of 20% and a pressure resistance of 5,000 psig. In a further preferred embodiment, the filter unit includes pores of a pore size of 0.00005 square inch and a porosity of 11.4%. In still another preferred embodiment, the filter unit includes pores having a pore size of 0.005 square inch and a porosity of 40%. In still another embodiment, the filter unit includes pores of a pore size of 0.00003 square inch.

To maximize solid/fluid separation efficiency, it is desirable to minimize filter pore size, while maximizing filter porosity and to operate at elevated separation pressures. Minimizing pore size is a challenge in conventional screw presses due to the need for cutting cylindrical passages into the filter jacket. This problem has now been addressed by the inventors. In the filter unit of the present invention, filter pores are formed by simply cutting a slot through a filter plate, which can be achieved much more easily than drilling holes in a pressure jacket. Using slots also allows for the creation of much smaller filter pores by using relatively thin filter plates and relatively narrow slots. For example, by using a filter plate of 0.005 inch thickness and cutting a slot of 0.01 inch width into the filter plate, a pore size of only 0.00005 square inch can be achieved. Moreover, in order to provide a relatively high porosity at elevated operating pressures, a separation module is provided for sealing connection to a source of a pressurized mass of liquid containing solids, for example a screw press.

In one aspect, the separation apparatus includes a pressurizable collection chamber and a filter unit for sealingly receiving the pressurized mass. The filter unit has a preselected filter pore size and a preselected porosity. The filter unit includes at least one filter plate having opposite front and back faces, a cover plate engaging the front face of the filter plate and a backer plate engaging the back face of the filter plate. The cover and backer plates define a throughgoing core opening sealed from the collection chamber for receiving the pressurized mass. The filter plates preferably also extend to the core opening, but can be sized to have a central opening slightly larger than the core opening. The filter plate has at least one throughgoing filter slot extending away from the core opening into the filter plate, the filter slot being sealed at the front and back faces by the cover and backer plates for forming a filter passage having the preselected filter pore size. The backer plate has a recess for defining together with the back face a drainage passage in fluid communication with the collection chamber and the filter passage. For increased porosity, the filter plate preferably includes a plurality of separate, filter slots for increasing the porosity of the filter unit and the drainage passage is in fluid communication with all the filter slots. To increase the porosity of the filter unit even further, the filter unit preferably includes multiple pairs of filter and backer plates arranged behind the cover plate in a stack of alternating filter and cover plates, whereby each backer plate sandwiched between two filter plates functions as the backer plate for one and the cover plate for the other filter plate. By alternating the filter and backer plates, the separating pressure capacity of the filter unit is increased. By using backer plates that are thicker than the filter plates, the pressure capacity of the filter unit can be further improved. Similarly by using backer and filter plates that are larger in diameter, the pressure capacity of the filter unit can be increased.

In one embodiment, the separation module is mountable to or integratable into the barrel of a screw press and the core opening is sized to fittingly receive a portion of the extruder screw of the press. The extruder screw preferably has close tolerances to the core opening of the filter block for continually scraping the compressed material away from the filter surface while at the same time generating a significant separating pressure. In the event that a small amount of fibers become trapped on the surface of the filter, they will be sheared by the extruder elements into smaller pieces and ultimately pass through the filter and out with the liquid stream as very fine particles. This provides a solid/fluid separation device which allows for the separation of solid and liquid portions of a material in a high pressure and optionally even high temperature environment.

In another aspect, the separating module for separating liquids or gases from a pressurized mass of liquid containing solids includes a sealable housing having a pressure jacket defining a collection chamber for liquids and gases; a liquid outlet and a gas outlet on the jacket for respectively draining liquids and gases from the collection chamber; an inlet end plate removably securable to an inlet end of the jacket; an outlet end plate removably securable to an outlet end of the jacket and at least one filter pack including a filter plate and a backer plate, the filter pack sandwiched between the inlet and outlet end plates; the filter and backer plates having an aligned core opening sealed from the collection chamber for receiving the pressurized mass, wherein the filter plate includes at least one throughgoing filter slot extending from the core opening into the filter plate and the backer plate defining a passage in fluid communication with the filter slot and the collection chamber.

Preferably, the sealable housing has two or more pairs of filter and backer plates. Preferably, the filter plate includes a plurality of filter slots. Preferably, each backer plate includes a circular groove in fluid communication will all filter slots of an adjacent filter plate.

Preferably, each of the filter and backer plates has a pair of opposite mounting tabs for alignment and interconnection of the plates. Each mounting tab may have a hole for receiving a fastening bolt, for alignment and clamping together of the stack of filter and backer plates in a continuous filter block. Alternatively, the hole for the fastening bolt is omitted and the pressure jacket includes ridges on an inner surface for aligning the tabs and preventing rotation of the filter and backer plates relative to the core opening.

In a further aspect, the present disclosure provides a use of the solid/fluid separating module as described for the processing of a material having a solid portion, a liquid portion and gas portion, to separate the solid portion from the liquid and gas portions.

In a further aspect, the present invention resides in a process for pretreating biomass, in particular lignocellulosic biomass.

Other aspects and features of the present disclosure will become apparent to those ordinarily skilled in the art upon review of the following description of specific embodiments in conjunction with the accompanying figures.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which:

FIG. 2a is a fragmentary horizontal sectional view of an exemplary apparatus as shown in of FIG. 1a, but including only one solid/liquid separation module, for reasons of simplicity;

FIG. 3a is a vertical sectional view of an exemplary apparatus as shown in of FIG. 1a, but including only one solid/liquid separation module, for reasons of simplicity;

FIG. 4a is a perspective view of the preferred tapered twin extrusion screw set used in the exemplary embodiment of FIG. 1a;

FIG. 5b shows an exploded view of the solid/fluid separation module shown in FIG. 5a;

FIG. 6 shows a filter (finger) plate of the separation module having narrow filter slots as drainage channels;

FIG. 6a shows an enlarged detail view of the filter (finger) plate of FIG. 4;

FIG. 6b shows a filter (finger) plate of the separation module having wider filter slots than the embodiment of FIGS. 6 and 6a;

DETAILED DESCRIPTION OF THE PREFERRED EMBODIMENTS

Figure 1:
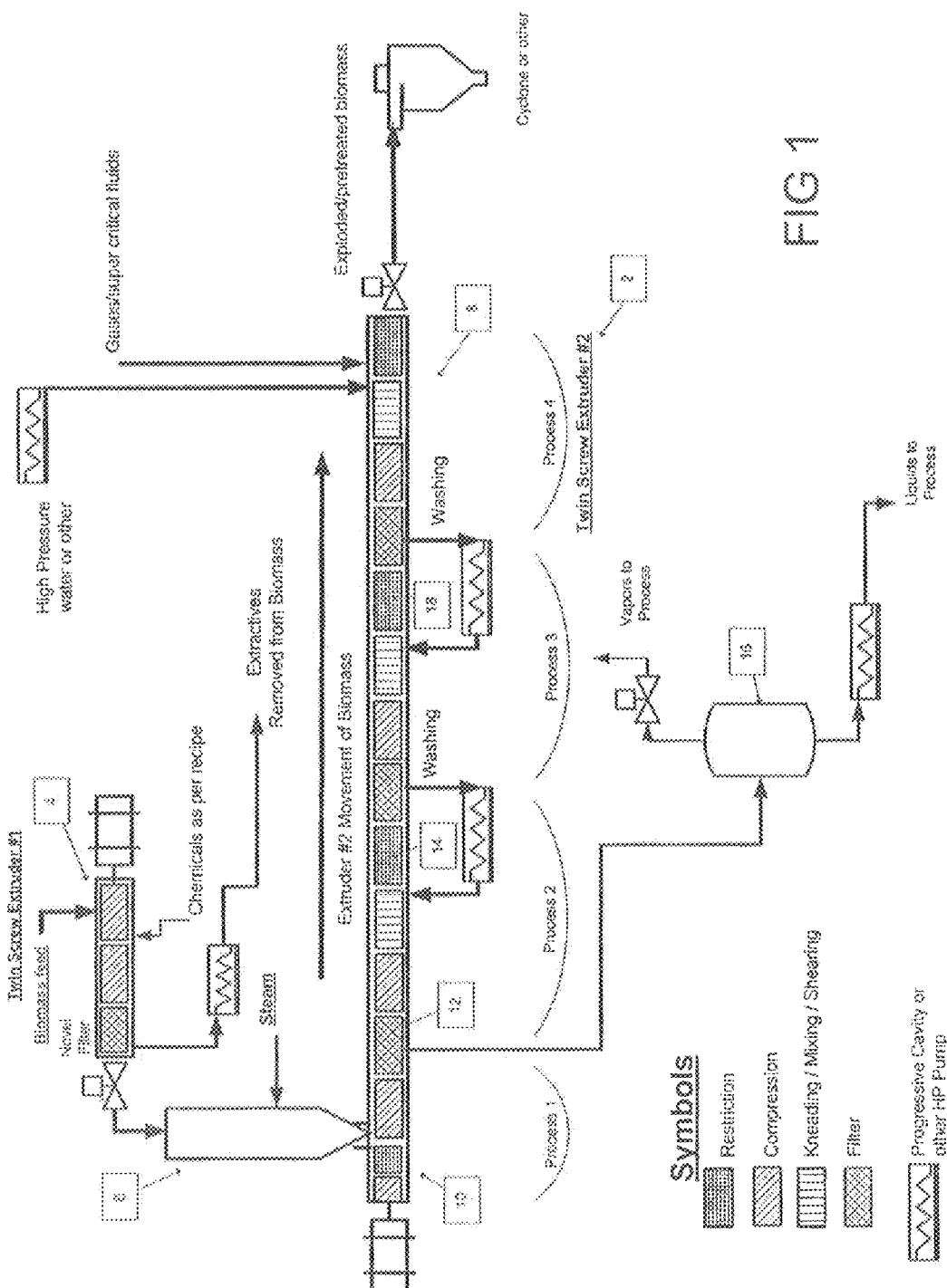
FIG. 1 shows a schematic view of an exemplary cellulose pre-treatment system schematically incorporating a twin screw extruder with solid-liquid separation module.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The preferred extruder unit of the invention includes a twin screw assembly having parallel or non-parallel screws with the flighting of the screws intercalated at least along a part of the length of the extruder barrel to define close-clearance between the screws and the screws and the barrel. Screw extruders with more than two extruder screws can also be used. Cylindrical or tapered, conical screws can be used. Preferred are tapered, conical screws, most preferably non-parallel conical screws. The close clearance creates nip areas with increased shear. The nip areas create high pressure zones within the barrel which propel material forwardly, while the material is kneaded and sheared. A specialized fluid separation unit is also provided, which allows fluids to be efficiently extracted from the extruded mixture.

The inventors developed a solid-liquid filtering device for use with a screw press conveyor, which filtering device can handle very high pressures (up to 20,000 psig) and surprisingly was able to generate solids levels from 50-90% well beyond that of anything commercially available or applied in the laboratory, when combined with a twin-screw extruder press. In addition, the liquid portion extracted contained little suspended solids, due to the very small pore size of the device, which provides additional benefit. This device is the subject of co-pending U.S. patent application US2012-0118517 (U.S. Ser. No. 13/292,449). The separation results and significantly high solids content in the filter cake were very surprising, since the combination of high pressure filtering unit and twin-screw extruder press resulted in a solid/liquid separation device able to develop virtually dry cake, which was completely unachievable to date without subsequent drying steps. The theory is that the twin screw is able to shear the material with a very thin cake layer at pressures far exceeding 300 psi while at the same time allowing trapped and bound liquid and water a path to migrate out of the solids and out of the apparatus through the novel filter device.

With the apparatus of the invention, one can apply significant shear forces/stresses to a fluid containing both liquids and solids, which forces are applied in a thin cake within a very strong and very fine filtering mechanism (strength of the filtering unit of up to 20,000 psi, with pores sizes down to 5 mircrons at temperatures up to 500 C), which at the same time allows the freeing up of liquid to migrate out through this fine filter. Thus, it is expected that the combination of this filter unit with a twin-screw extruder press will provide significant benefits to a cellulosic ethanol process and to other processes, especially those dealing with the dewatering of Non-Newtonian Fluids which have shear thinning characteristics or a viscoplastic material which breaks down in separate solid and liquid components once a specific shear stress is imparted to the material.

Turning now to the drawings, FIG. 1 a schematically illustrates an exemplary solid fluid separating apparatus 200 in accordance with the invention. The apparatus includes a twin-screw extruder 210 with barrel modules 212 and separation modules 214, which extruder 210 is driven by a motor 226 through an intermediate gear box drive 224, both the motor and gear box being conventional components.

Figure 1A:
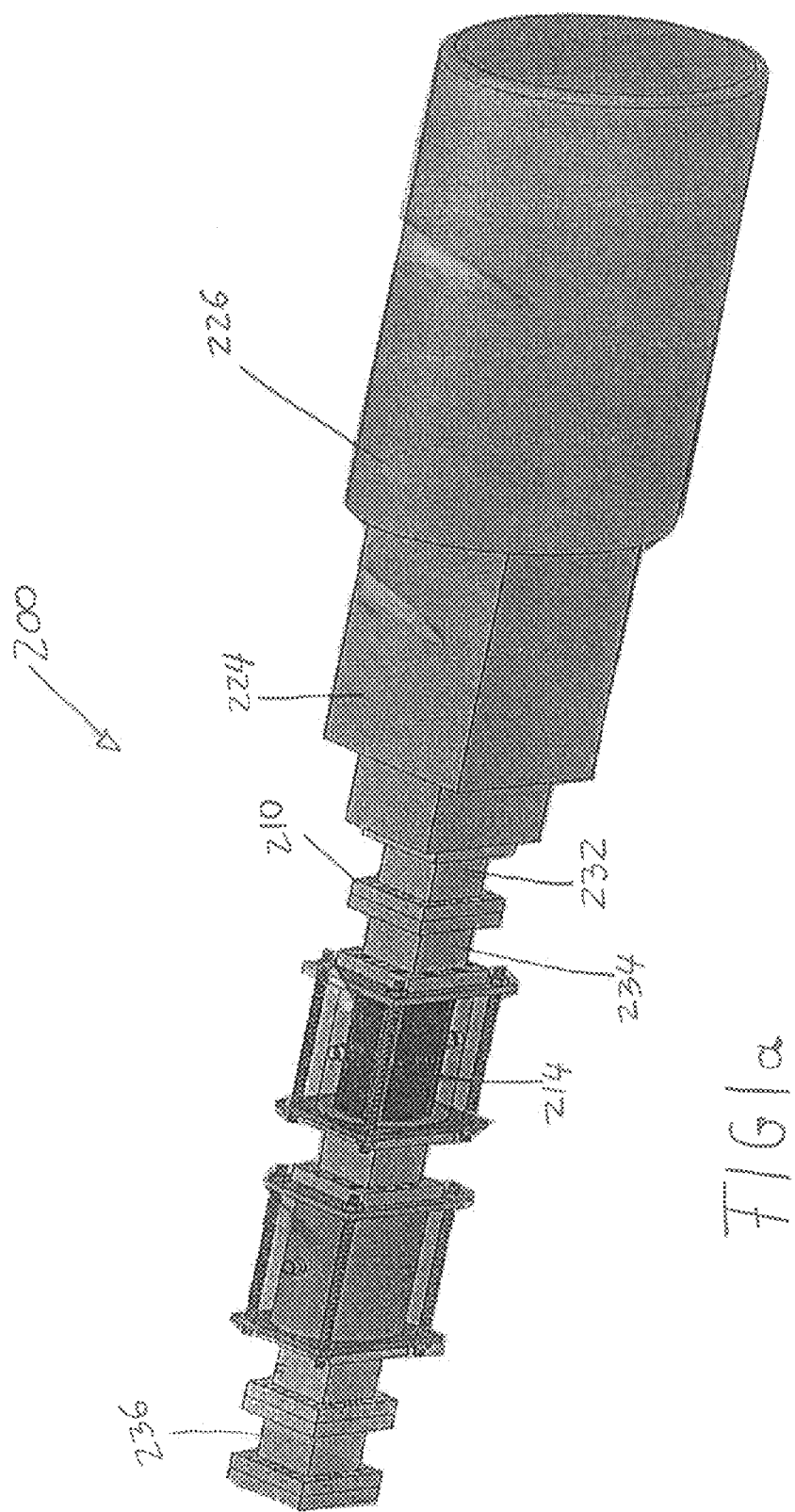
FIG. 1a is a partially schematic side elevational view of an exemplary solid/fluid separating apparatus in accordance with the invention.

FIGS. 2a and 3a illustrate a simplified exemplary embodiment of the apparatus shown in FIG. 1a, including only a single separating module 214. As is apparent from FIGS. 2a and 3a, the apparatus 200 broadly includes a sectionalized barrel 216 presenting an inlet 218 and an outlet 220, with a specialized twin screw assembly 222 within the barrel 216; the assembly 222 is coupled via the gear box drive 224 to the motor 226. The barrel 216 in the simplified exemplary embodiment illustrated is made up of two end-to-end interconnected tubular barrel heads 228, 230, and a separating module 232. Each barrel head is provided with an external jacket 234, 236, to allow circulation of cooling or heating media for temperature control of the extruder device. The separating module 232 includes an external pressure chamber 238. It will be observed that the first head 228 includes the inlet 218, while the separating module 238 includes a die 240. The die includes a central opening, the width of which is selected to produce the desired back pressure in the barrel 216 and the separating module 238. The pressure in the barrel 216 and the separating module 238 can also be controlled by the fit between the screws 250,252 and the barrel 216 and the rotational speed of the motor 226 and, thus, the screws 250, 252. Each of the heads 228-230 also includes an internal sleeve 242, 244 which cooperatively define a tapered, continuous screw assembly-receiving opening 248 within the barrel. This opening 248 has a generally "figure eight" shape in order to accommodate the screw assembly 222. As illustrated, the opening 248 is widest at the rear end of head 228 and progressively and uniformly tapers to the end of the apparatus at the outlet 220 of the barrel 216.

Figure 4A:
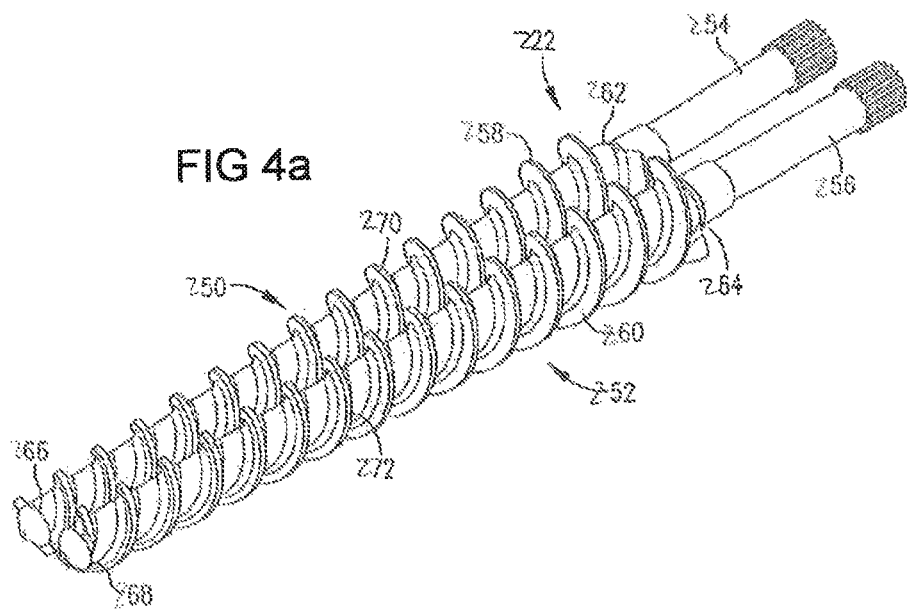
Figure 4B:
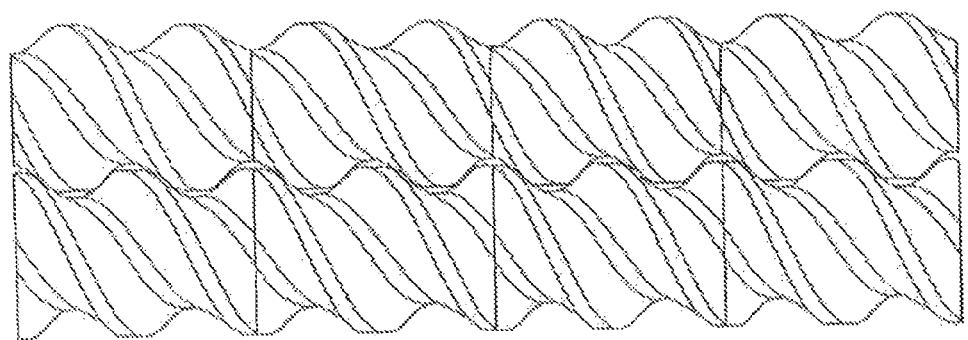
FIG. 4b is a plan view of a non-tapered twin extrusion screw set, which may be used in the exemplary embodiment of FIG. 1a together with a cylindrical barrel.

The screw assembly 222 includes first and second elongated screws 250, 252 which are in side-by-side relationship as best seen in FIG. 4a. If a non-tapered barrel of constant cross-section is used (not shown), a pair of straight or cylindrical screws as shown in FIG. 4b can be used as screws 250 and 252. Each of the screws 250, 252 includes an elongated central shaft 254, 256 as well as outwardly extending helical flighting 258, 260. In the tapered screws as shown in FIGS. 2a and 3a, the shafts 254, 256 each have an outer surface which is progressively and uniformly tapered through a first taper angle from points 262, 264 proximal to the rear ends of the corresponding shafts 254, 256, to forward points 266, 268 adjacent the forward ends of the shafts. This taper angle generally varies from about 0.5-5°, and more preferably from about 1-2.2°. The illustrated embodiment has a taper angle of 1.3424°.

The flighting 258, 260 (in the embodiment illustrated double flights are used, but single or multiple flights are also a possibility) extends essentially the full length of the shafts 252, 254 between points 262, 266 and 264, 268. Thus, the flighting 258, 260 proceeds from a rear end adjacent the point 262, 264 in a continuous fashion to the forward point 266, 268. In addition, the flighting presents an outer surface 270, 272 on each of the screws 250, 252. The geometry of the flighting 258, 260 is such that the flight depth progressively and uniformly decreases as the flighting proceeds from the rear end to the front end of the screws 250, 252. Consequently, the outer surfaces 270, 272 of the flighting 258, 260 also taper from rear to front in a progressive and uniform fashion. The second angle of taper of the flighting depth and the outer flighting surfaces can range from 2-6° and in the illustrated embodiment is 3.304°.

Finally, the flighting 258, 260 is designed so that the width of the flighting outer surfaces 270, 272 increases in a progressive and uniform fashion from the rear end of the screws to the front ends thereof. This configuration is best illustrated in FIGS. 3a and 4a, where it will be seen that the width is relatively small at the rear ends of the screws 250, 252, but increases to a wider width at the forward ends of the screws. As indicated previously however, the width may be constant throughout the length of the screws, or could narrow from the rearward ends to the forward ends thereof. Accordingly, the ratio of the width at the forward or input end of each screw to the width at the rearward or output end may range from about 0.5 to 5.

The screws 250, 252 are preferably oriented so that their respective center axes are at a converging angle relative to each other, so that an included angle is defined by the center axes. This included angle may range from about 1-8°. The included angle in the illustrated embodiment is 2.3240°. When the screws 250, 252 are oriented as described within barrel opening 248, the flighting 258, 260 of the respective screws 250, 252 is intercalated, i.e., each of the flightings defines an imaginary frustum of a cone between the rear and front ends of the corresponding screws, and the flighting 258, 260 extends within the imaginary frustum of the adjacent screw. As shown, and by virtue of the selection of appropriate first and second taper angles and the included angle between the center axes 274, 276, the flighting presents a plurality of close-clearance nip zones 278 along the length of the screw assembly 222. These nip areas present a clearance between the flightings 258, 260 which is preferably substantially constant along the length of the screw assembly 222. More generally, if desired such nip clearances could increase or decrease along the length of the assembly 222. In addition to the nip areas 278, it will be observed that the assembly 222 also presents material backflow passageways 280 and kneading zones 282 between the screws 250, 252.

During operation, the mixture to be separated is passed into and through the extruder device 214. The screw assembly 222 is rotated so as to co-rotate the screws 250, 252, usually at a speed of from about 20-1,200 rpm. Pressures within the extruder are usually at a maximum just adjacent the outlet die, and usually range from about 300-20,000 psig, more preferably from about 1,000-10,000 psig. Maximum temperatures within the extruder normally range from about 40-500° C.

Extrusion conditions are created within the device 214 so that the product emerging from the extruder barrel usually has a higher solids content than the product fed into the extruder. The preferred solids content to be achieved in biofuel production from lignocellulosic biomass to be achieved with the separation device of this disclosure is above 50%.

During passage of the extrudable mixture through the barrel 216, the screw assembly 222 acts on the mixture to create, together with the endmost die 240, the desired pressure for separation. The specific configuration of the screws 252, 254 as described above generates separating conditions not heretofore found with conventional screw presses. That is, as the mixture is advanced along the length of the co-rotating screws 252, 254, it continually encounters the alternately upper and lower close-clearance nip areas 278 which generate relatively high localized pressures serving to push or "pump" the material forwardly; at the same time, the product is kneaded within the zones 282 as the screws rotate, and backflow of material is allowed through the passageways 280. The result is an intense mixing/shearing and cooking action within the barrel 216. Furthermore, it has been found that a wide variety of solid/liquid mixtures may be separated using the equipment of the invention; simply by changing the rotational speed of the screw assembly 222 and, as necessary, temperature conditions within the barrel, which means merely by changing the operational characteristics of the apparatus. This degree of flexibility and versatility is unprecedented in the filtration art.

Figure 5A:
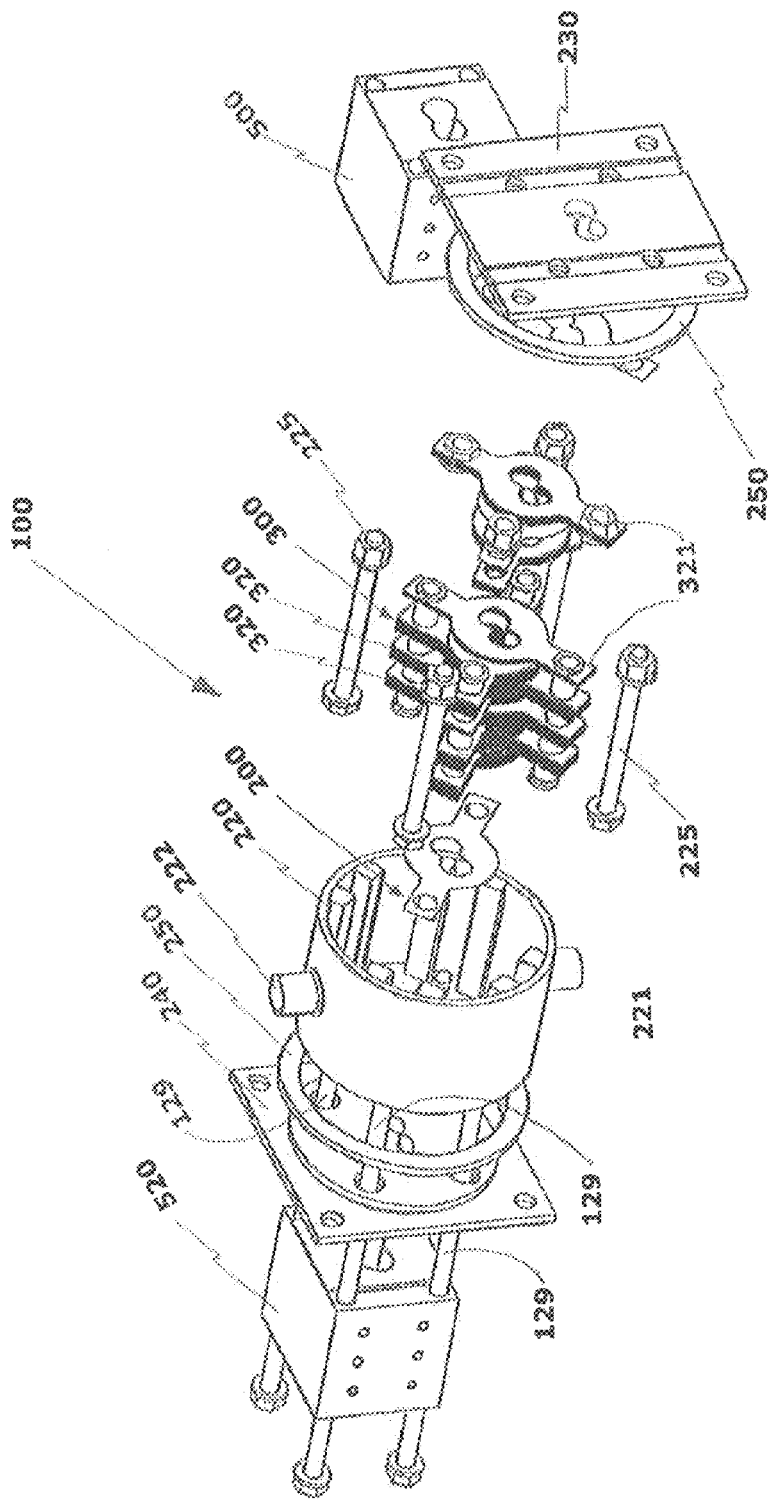
FIG. 5a schematically illustrates an embodiment of a solid/fluid separation module in exploded view.

One embodiment of a membrane-free solid/fluid separator module 100 in accordance with the invention is shown in FIGS. 5 and 5a, which module is capable of withstanding very high internal pressure forces (up to 5000 psig). This solid/fluid separator module can be used with the process and apparatus shown in FIG. 1 while being able to control the permeability/porosity (filtration capability) by various filter plate configurations and plate thicknesses as required by the type of biomass/solids treated.

An exemplary embodiment of the separation module 214, as illustrated in FIG. 1a, is shown in more detail in FIG. 5 as solid/fluid separation module 100. It is used as part of the solid/liquid separating apparatus of FIG. 1a and is mounted between the twin screw extruder barrel (from here on barrel 500 and an extruder block 520. The module 100 separates fluids (liquid and/or gas) from a liquid containing mass of solids compressed by the screw press, preferably to pressures above 100 psig. The separation module 100 includes a collection chamber 200 and a filter unit 300 having a porosity of 5% to 40% (total pore area relative to the total filter surface). Preferably, the module 100 withstands operating pressures up to 5000 psig at a filter porosity of 5 to 40%, more preferably 11 to 40%. The filter unit 300 preferably includes a plurality of filter pores with a pore size of 0.00005 to 0.005 square inch.

In a preferred embodiment, the filter unit 300 includes filter pores having a pore size of 0.00005 square inch for the separation of fine solids, a porosity of 5.7% and a pressure resistance of 2,500 psig. In another embodiment, the filter unit 300 includes filter pores having a pore size of 0.005 square inch and a porosity of 20% and a pressure resistance of 5,000 psig. In a further preferred embodiment, the filter unit 300 includes filter pores of a pore size of 0.00005 square inch and a porosity of 11.4%. In still another preferred embodiment, the filter unit 300 includes filter pores having a pore size of 0.005 square inch and a porosity of 40%.

The basic construction of the separation module 100 is shown in FIGS. 5 and 5*a*. A collection chamber 200, which is capable of withstanding the highest pressure of any component is used to separate the filtered out fluids into gases and liquid. The collection chamber is defined by a pressure jacket or housing 220 and intake and output end plates 230 and 240. Liquid can be drained from the collection chamber 200 through a liquid drain 221, preferably located at the lowest point on the pressure jacket 220. The pressure jacket 220 further includes a plurality of alignment ridges 223 extending parallel to a longitudinal axis of the jacket on the inside of the jacket, for alignment of the filter and backer plates within the collection chamber 200. Gas accumulated in the collection chamber 200 can be exhausted from the chamber through a gas drain 222, preferably located at the highest point on the pressure jacket 220. The high pressure collection chamber 200 is sealed by way of circular seals 250 positioned between axial ends of the pressure jacket 220 and the end plates 230, 240. This high pressure/high temperature capability allows for washing of biomass with fluids such as ammonia, CO2 and water which are normally in the gaseous state at process operating temperatures of 50 to 250° C. The separation module is fastened together by assembly bolts 225 located outside the pressure jacket 220 for pulling the end plates 230, 240 together and clamping the pressure jacket 220 and circular seals 250 therebetween. Filter unit clamping bolts 129 (see FIG. 2) can also be used to clamp together the filter packs 321, 322 in the filter unit 300. In a preferred embodiment, the filter unit clamping bolts extent through the end plates 230, 240 and provide for additional clamping together of the separation module 200. The filter unit clamping bolts 129 can also extend through the extruder block 520 for fastening of the extruder block to the separation module. However, to minimize the number of penetration points in the separation module 200 which need to be reliably sealed for maintaining a pressure in the collection chamber 200, the filter unit fastening bolts 129 are omitted and all clamping together of the pieces of the separation unit is achieved by fastening structures, such as bolts 225, located outside the pressure jacket. Depending on the pressures used, some gases can be separated right in the collection chamber 200, or in some circumstances (as shown in FIG. 1) a separate flash vessel can be utilized to optimize the overall efficiency of the process.

The filter unit 300 includes several plate blocks 320 assembled from a stack of the basic filter packs 321, 322 of the invention, the combination of a filter plate 120 placed against a backer plate 160,180, which are described in more detail below with reference to FIGS. 4 to 12. In the illustrated embodiment, there are right hand filter packs 321 including a filter plate 120 and a right hand backer plate 160, and left hand filter packs 322 including a filter plate 120 and a left hand backer plate 180. However, completely symmetrical embodiments which do not require left and right hand components are also possible.

In one aspect, the separation module includes a pressurizable collection chamber 200 and a filter unit 300 for sealingly receiving the pressurized mass (not shown). The filter unit 300 has a preselected filter pore size and a preselected porosity. The filter unit 300 includes at least one filter plate 120 having opposite front and back faces 121, 123, a cover plate 230 engaging the front face 121 of the filter plate 120 and a backer plate 160, 180 engaging the back face 123 of the filter plate 120. The filter, cover and backer plates (120, 230, 160/180) define a throughgoing core opening 128 sealed from the collection chamber 200 for receiving the pressurized mass (not shown). The filter plate 120 has at least one throughgoing filter slot 132 extending away from the core opening 128 into the filter plate, the filter slot 132 being sealed at the front and back faces 121, 123 by the cover and backer plates 230, 160/180, for forming a filter passage having the preselected filter pore size. The backer plate 160/180 has a recess 164 for defining together with the back face 123 a drainage passage in fluid communication with the collection chamber 200 and the filter slot 132 (see FIGS. 11 and 12). For increased porosity, the filter plate 120 preferably includes a plurality of separate filter slots 132 and the drainage passage 164 is in fluid communication with all the filter slots 132. To increase the porosity of the filter unit even further, the filter unit preferably includes multiple pairs of filter and backer plates (120, 160/180) arranged behind the cover plate 230 in a stack of alternating filter and cover plates, whereby each backer plate 160/180 sandwiched between two filter plates 120 functions as the backer plate for one filter plate and as the cover plate for the other filter plate. By alternating the filter and backer plates (120, 160/180), the separating pressure capacity of the filter unit 300 is increased. By using backer plates 160/180 which are thicker than the filter plates 120, the pressure capacity of the filter unit 300 can be further improved.

In the embodiment of FIG. 5, the separation module 100 is mounted to the barrel 500 of a screw press and the core opening 128 is sized to fittingly receive a portion of the press screw (not shown). The press screw of a screw press generally has very close tolerances to the core opening 128 of the filter block 300 and continually scrapes the compressed material away from the filter surface while at the same time generating significant separating pressures. In the event that a small amount of fibers become trapped on the surface of the filter, they will be sheared by the extruder screws into smaller pieces and ultimately pass through the filter and out with the liquid stream as very fine particles. This provides a solid/fluid separation device which allows for the separation of solid and liquid portions of a material in a high pressure and temperature environment.

By having the extruder screw swipe the filter pores 134 tangentially, the separation device is less susceptible to clogging. Due to the elevated porosity and pressure resistance of the separation module 100 in accordance with the invention, a dry matter content in the dry portion discharge of up to 90% is possible, while at the same time a relatively clean liquid portion is achieved, due to the small pore size, with suspended solids being as low as 1%. It will be readily understood that the solid/fluid separation module in accordance with the invention can be used in many different applications to separate solid/fluid portions of a material.

Figure 13:
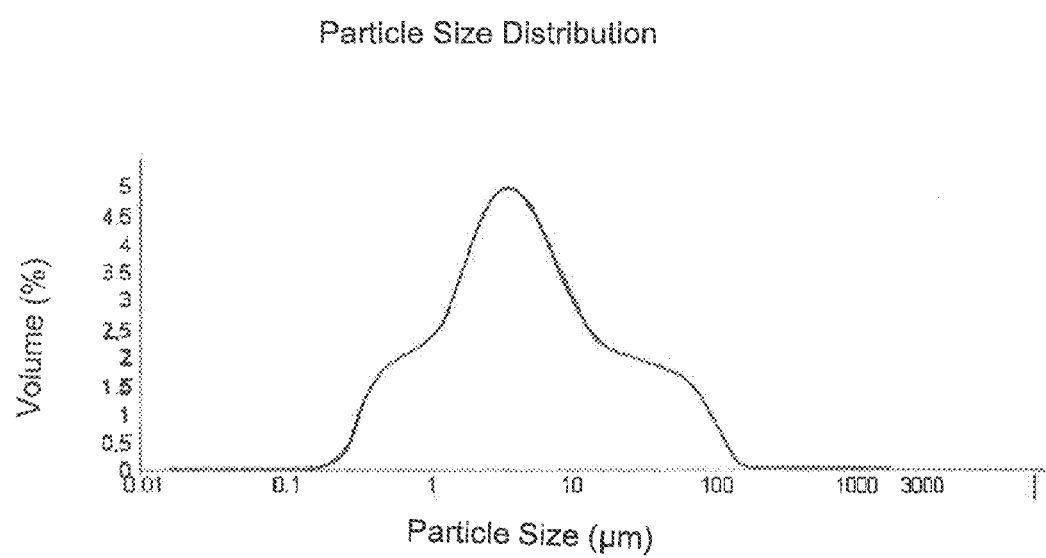
FIG. 13 shows the particle size distribution of the particles found in a filtrate obtained with one embodiment of the separation module.

In pilot testing on a continuous basis, 100 g units of biomass containing 40 g of solids and 60 g of water were washed with 40 g of water and then the liquid was squeezed out the filter using 600 psig internal force at a temperature of 100 C to obtain a dry biomass discharge (solids portion of the liquid/solid biomass) containing 39 g of suspended solids and 5 g of water. The filtrate containing 95 g of water was relatively clean containing only 1 g of suspended solids with mean particle size of 5 microns and a particle distribution as per FIG. 13.

Further, as the solid/fluid separation device of the present invention is less susceptible to clogging, there is less need for maintenance as is periodically required with known separation devices. Thus, the solid/fluid separation device can be used in a process with less downtime and less maintenance resulting in increased production capability and less cost.

FIG. 6 shows a fine filter plate 120 having a circular middle section 122 attached to a first support tab 124 and a second support tab 126. The circular middle section 122 has a figure eight shaped core opening 128 for fittingly receiving the press screws of a twin screw press. The filter plate 120 has a front face 121 and a back face 123. The core opening 128 is surrounded by a plurality of fine fingers 130 and intermediate filter slots 132. To achieve maximum solid/fluid separation efficiency, it is desirable to minimize filter pore size, while maximizing filter. Minimizing pore size is a challenge in conventional screw presses due to the need for cutting cylindrical passages into the filter jacket. This problem is addressed with a filter unit in accordance with the invention, wherein filter pores are formed by simply cutting a slot 132 into a thin filter plate 120. The filter slot 132 is cut though the full thickness of the plate 120 and is thus referred to herein as a throughgoing slot. Very small filter pores can be achieved with filter plates 120 in accordance with the invention by using very thin filter plates 120 and very fine slots 132 as shown in FIGS. 6 and 6a. For example, by using a filter plate of 0.005 inch thickness and cutting a slot of 0.01 inch width into the filter plate, a pore size of only 0.00005 square inch can be achieved.

As shown in FIG. 6a, the very fine slots 132 and intermediate fine fingers 130 are shaped and positioned so that they provide filter slots that extend from the core opening 128 into the filter plate 120 and towards an outer portion of the middle section 122. Preferably, the ends of the filter slots 132 are all located on a circle concentric with and spaced inwardly from an outer edge of the circular middle section 122. To improve liquid flow through the fine drainage channels, the channels are narrower at their inner end 134 into the core opening 128 and flare outwardly to their outer end 136.

Figure 7:
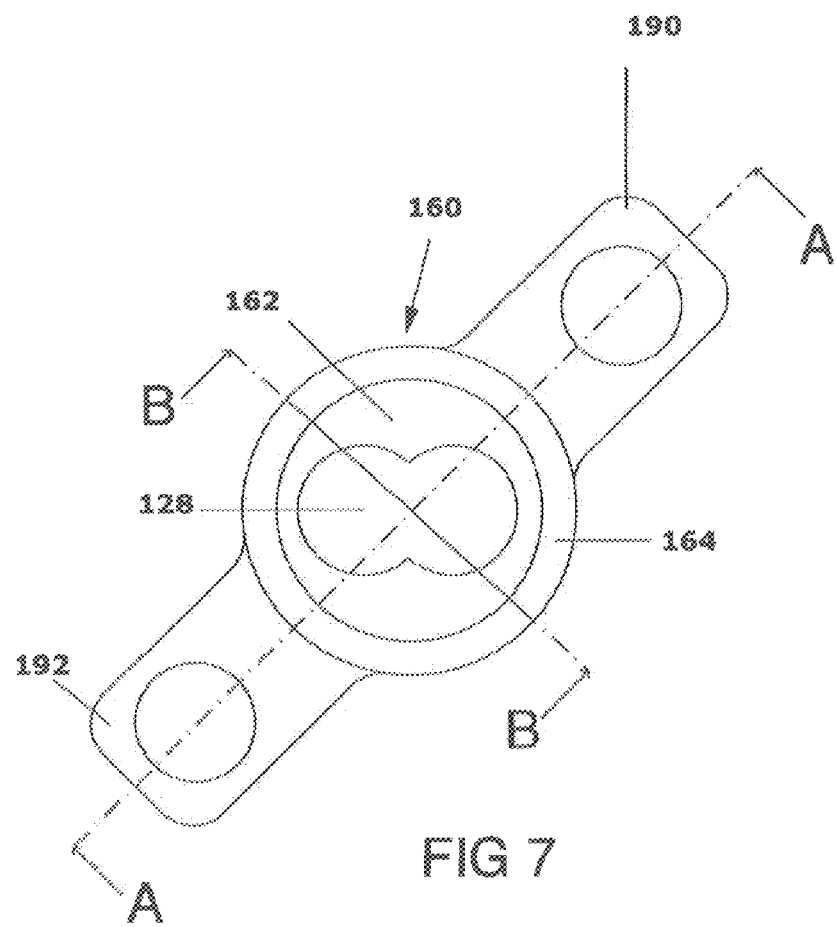
FIG. 7 shows a right hand backer plate of the embodiment of FIG. 3.
Figure 8:
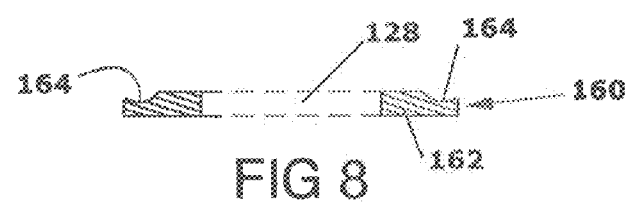
FIG. 8 is a cross-sectional view of the backer plate of FIG. 7, taken along line B-B.
Figure 9:
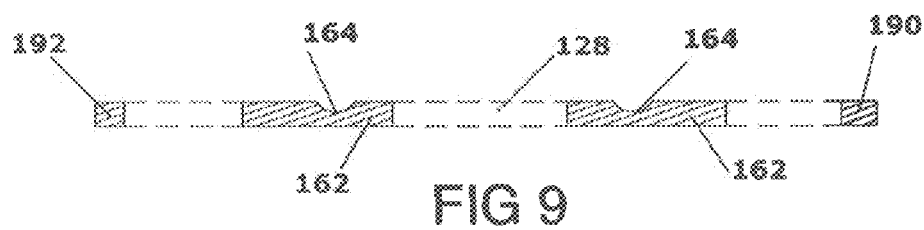
FIG. 9 is a cross-sectional view of the backer plate of FIG. 7, taken along line A-A.
Figure 10:
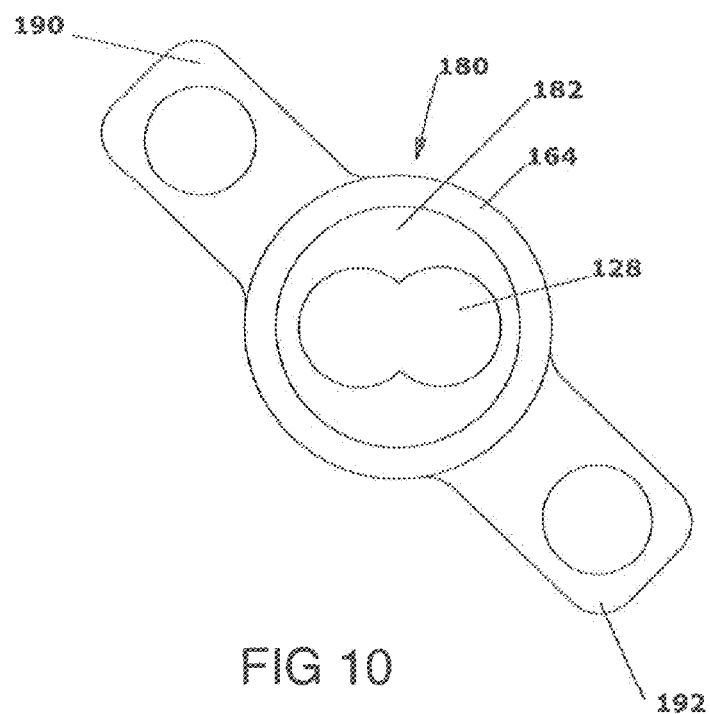
FIG. 10 shows a left hand backer plate of the embodiment of FIG. 3.
Figure 11:
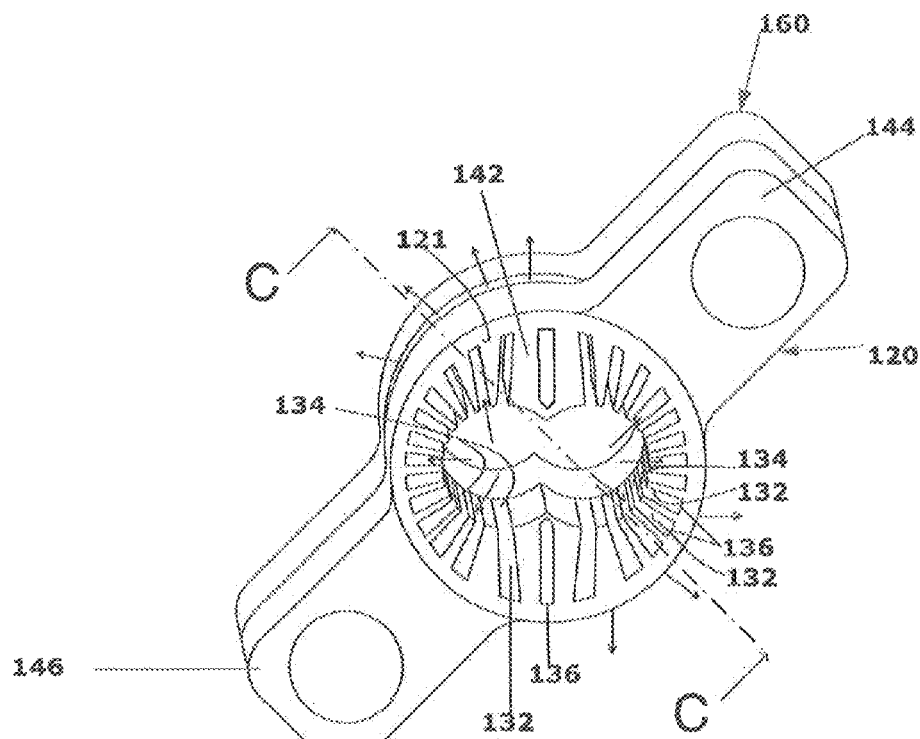
FIG. 11 is an isometric view of a pair of filter and backer plates in accordance with FIGS. 6 and 7.
Figure 12:
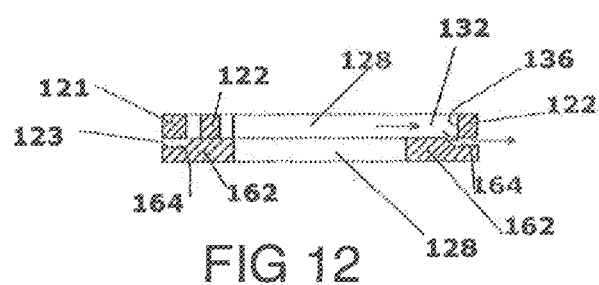
FIG. 12 is a cross-sectional view of the pair of filter and backer plates of FIG. 11, taken along line C-C.

The filter plate 120 is positioned against a backer plate as shown in FIGS. 11 and 12. This will be discussed in more detail further below. In the illustrated embodiment, there are two types of backer plates, left hand backer plates 160 as shown in FIG. 7 and right hand backer plates 180 as shown in FIG. 10. The left and right hand backer plates 160, 180 have the same principle construction and include a circular central portion 162, 182 with the core opening 128 and mounting tabs 190, 192 extending from the central portion 162, 182. The only difference between the left and right hand backer plates is the orientation of the mounting tabs 190, 192 in relation to the core opening 128, with the tabs extending at a 45 degree angle to the right, relative to the transverse axis of the core opening 128 in the right hand backer plate 160 and at a 45 degree angle to the left in the left hand backer plate 180. Left and right hand backer plates are thereby used to create a 90 degree shift in the holding pattern of the plates and to provide a means for liquid to drain to the bottom of the collection chamber and gases to flow to the top of the collection chamber if the particular biomass requires liquid/gas separation at this stage. The number of consecutive right hand plates (or conversely left hand plates) with intermediate filter plates is usually equal to at least 0.25" thick but can be as much as 1" thick depending on the overall number of plates.

The filter plate mounting tabs 124, 126 and the backer plate mounting tabs 190, 192 are all shaped to be fittingly received between pairs of alignment ridges 223 mounted on an inner wall of the pressure jacket 220. Each type of backer plate has a machined peripheral groove 164 on the central portion 162, 182 as is apparent from FIGS. 7 to 9 and 10, the cross-sections through the left handed backer plate 180 being identical to those of the right handed backer plate 180 shown in FIGS. 8 and 9. The peripheral groove 164 is positioned to correspond with the outer ends 136 of the filter slots 132 in the filter plate 120 (see FIGS. 4-6), when the filter plate 120 and backer plate 160, 180, are positioned back to back with the core opening 128 aligned as shown in FIGS. 11 and 12.

FIGS. 11 and 12 illustrate the most basic filter pack in accordance with the invention, a filter plate 120 and a backer plate 160 engaging the rear face 123 of the filter plate. Fluids (liquid and/or gas) entrained in the pressurized mass (not illustrated) fed through the core opening 128 is forced by the separating pressure present to flow into the filter slots 132 (see arrows). At the end 136 of the filter slot, the fluid is redirected to flow into the peripheral groove 164 in the backer plate 160 and exits the peripheral groove 164 into the collection chamber (see FIGS. 11, 12 and 3). As such, the fine filter plate 120 can filter out liquid and very small particles which travel through the filter slots 132 in a direction transverse to the flow of biomass through the figure eight shaped core opening 128.

Figure 6B:
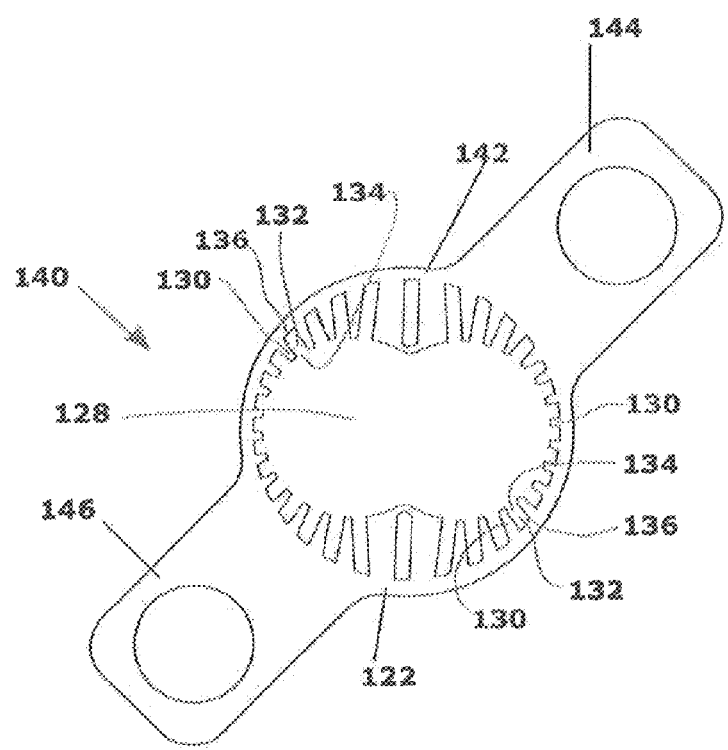

Conversely with a larger pore plate configuration, such as that shown in FIG. 6b, which is suitable for larger particles/cellulose biomass fibers, the limiting factor on porosity is the plate thickness of the filter plate. It has been found with cellulose biomass that this coarser filter plate configuration provides good solid-liquid separation, while at the same time minimizing the surface area and number of plates required to achieve the same liquid separation with the same internal pressure as with the fine filter plate of FIG. 6.

As shown in FIG. 6b, a larger pore, coarse filter plate 140 has a circular middle filter section 142 attached to a first support tab 144 and a second support tab 146. The circular middle filter section 142 has a figure eight shaped core opening 128 defined by a plurality of larger fingers 130 between filter slots 132 cut through the filter plate 140. As shown in FIG. 6b, the larger fingers 130 are positioned between coarse drainage channels 132.

The coarse filter plate 140 is positionable against a backer plate, such as the left hand backer plate 160 shown in FIG. 7 to achieve a filter pack as shown in FIGS. 11 and 12.

Overall, with the higher pressure capability, either more liquid can be squeezed from the solids or, for the same material dryness, a higher production rate can be achieved per unit filtration area. The quality of filtration (solids capture) can be controlled depending on plate configurations and thicknesses. The filtration/pressure rating/capital cost can be optimized depending on the filtration requirements of the particular biomass. The plate configurations can be installed in an extruder (single, twin or triple screws) to develop high pressure, high throughput, continuous separation. The solid/fluid separation module is self cleaning (for twin and triple screws) due to the wiping nature of the screws and the cross axial flow pattern. The filtration area is flexible depending on process requirements as the length of plate pack can be easily custom fit for the particular requirements. The module can be used to wash solids in a co current or counter current configuration in single or multiple stages in one machine reducing capital cost and energy requirements. The pressure of the liquid filtrate can be controlled from vacuum conditions to even higher than the filter block internal pressure (2,000 to 3,000 psig) if required. This provides great process flexibility for further separations in the liquid stream (example super critical $CO_2$ under high pressure, ammonia liquid used for washing under high pressure, or release of VOC and ammonia gases in the liquid filtrate chamber using vacuum). The high back pressure capability (higher than internal filter block pressure) can be used to back flush the filter during operation in case of pluggage or scaling of the filter minimizing down time.

Fine Filter Porosity

The size of the fine pores is the thickness of the fine plate x the width of the slot at the core opening. In the filter plate of FIG. 6, the pore size is 0.005" (thickness of the plate)×0.010" (width of the slot at the opening)=0.00005 square inch per pore. There are 144 pores per plate for a total pore area of =0.0072 square inch open area per plate.

In an experimental setup using a small, 1 inch diameter twin screw extruder, this finger plate was paired with one 0.020" thick backer plate, resulting in a total filter area of 0.1256 square inches. Therefore the total open area of this one set of the experimental plates (filter pack) calculated as 0.0072/0.1256=5.7%. At this porosity, the pair of experimental plates (0.020" thick backer plates) was able to withstand a separation pressure of 2,500 psig. A 1" thickness pack of experimental plates included 40 filter plates in total×0.0072 square inch=0.288 square inch of open area. That equals to more than a 0.5" diameter pipe, all achievable within a distance of only 1 inch of extruder length in the small 1" diameter extruder used.

Coarse Filter Porosity

In the experimental coarse filter plate used, as shown in FIG. 6b, in terms of filtering capability and liquid flow path, the width of the filter slots was basically the same as the thickness of the filter plate, resulting in a series of axial grooves. The total open area of one set of plates (coarse filter plate+backer plate) is a ratio of the plate thickness which in this case=0.005/0.025=20% or about 4 times the open area of the fine filter plate system. Using coarse plates in a 1" thickness pack of plates, at 40 finger plates in total, we ended up with 40×0.0209 square inch open area per plate=0.837 square inch of open area. This is larger than a 1" diameter pipe, all achieved within a distance of 1 inch of extruder length in the small 1" diameter extruder used.

For both types of plates, the porosity can be significantly increased by decreasing the thickness of the backer plates, while keeping the filter plate at the same thickness. Reducing the backer plate thickness by 50% will double the porosity of the filter unit. Meanwhile, the strength of the filter unit will decrease whenever the backer plate thickness is decreased, but this can be counteracted by increasing the overall diameter of the backer plates, making the liquid flow path slightly longer but keeping the open area the same.

The use of filter plates 120 for the manufacturing of the filter module allows for low cost production of the filter, since low cost production methods can be used. The plates can be laser cut, or for coarser filtration the plates can be stamped. The overall equipment cost for biomass pretreatment is also lower due to the capability of having multiple process steps occurring in a single machine. The solid/fluid separation module can accommodate three-phase separation simultaneously.

The type of material used for the manufacture of the filter unit can be adapted to different process conditions. For example, in low pH/corrosive applications materials like titanium, high nickel and molybdenum alloys can be used.

In particular, the inventors have developed a solid/fluid separation device which separates solid and liquid portions of a material and is less susceptible to clogging versus known solid/fluid separation devices. It is contemplated that the solid/fluid separation device can be used in many different applications to separate solid/fluid portions of a material. Further, as the solid/fluid separation device of the present invention is less susceptible to clogging, there is less need for maintenance including back washing as is periodically required with known devices. Thus, the solid/fluid separation device can be used in a process with less downtime and less maintenance resulting in increased production capability and less cost.

In the solid/fluid separation device described, the screw elements that transfer the material internally in the separation device preferably have very close tolerances to the internal surface of the filter block and continually scrape the material away from the filter surface. In the event that a small amount of fibers became trapped on the surface of the filter, they will then be sheared by the closely spaced extruder elements into smaller pieces and ultimately pass through the filter and out with the liquid stream.

The total number of plate pairs (finger and backer plates) can vary depending on the biomass and controls the overall filter area. For the same liquid separation conditions, more plates/more surface area is required for smaller pores. The size of the pores controls the amount of solids which pass to the liquid portion. Each biomass has a need for a certain pore size to obtain a certain solids capture (amount of suspended solids in liquid filtrate).

The following examples set forth a series of separation runs for the separation of several different types of solid/liquid mixture, slurries, etc., using the improved twin screw extruder separating apparatus of the invention. It is to be understood, however, that these examples are provided by way of illustration and nothing therein should be taken as a limitation upon the overall scope of the invention.

Example I

Biofuel Process

As shown in FIG. 1, a simple continuous cellulosic ethanol pre-treatment system 2 of the present invention consists of only three machines. A first extruder 4 being used as a continuous high pressure plug feeder/mixer for biomass. The extruder 4 feeds the biomass into a vertical reactor 6. The vertical reactor 6 is capable of having a long residence time. The vertical reactor 6 feeds the biomass into a second extruder 8, preferably a twin screw extruder. The pretreatment process comprises flowing the biomass through the first extruder 4, the vertical reactor 6, and the second extruder 8.

The extruder 4, which may also be a twin screw extruder, is used to provide a continuous feed into the pressurized vertical reactor 6. Mixing of various chemicals in the extruder 4 is possible depending on the type of feedstock.

The extruder 4 has an automatic valve, which closes upon loss of feed to prevent loss of pressure in the case of loss of feedstock.

Vertical Reactor 6 is capable of operating with various chemicals at pressures of up to 350 psig and temperatures of up to 425° F. (220° C.) depending on the biomass. Residence time in the vertical reactor 6 can be varied from a few minutes to many hours depending on the biomass.

The partially treated biomass is discharged from the vertical reactor 6 into the second extruder 8 at a pressurized feed zone 10. In the second extruder 8, most of the solid biomass moves to an output end (right side in FIG. 1), and a small fraction is conveyed backward to create a pressure seal on the drive shafts. In the second extruder 8, higher pressures are generated than in the first reactor, as required by various biomasses and the pre-treatment process is completed by two, three or more separate processes depending on the biomass.

Wash liquid (water, ammonia or other) moves counter or co-current to the flow of solids biomass (to the left in FIG. 1) such that the biomass is washed with the cleanest liquid at the end of the extruder. Gases or super critical fluids such as carbon dioxide can be injected at the output end to improve explosive force as required depending on the biomass treated. At the output end various extruder screws, and/or another reactor vessel, and/or a control valve and/or a rotating orifice can be used to create a dynamic seal and explosive force required by different types of biomass at different pressures and dry matter content. Upon explosive expansion of the biomass from one of these devices at the output, a cyclone or other separating device is used to collect both the solids and any gases, which are ejected.

Upon entering the second extruder 8, most of the biomass is conveyed forward while a small amount is conveyed backward to create a dynamic pressure seal to prevent leakage from the vertical reactor 6. The biomass enters process stage 1, as shown on FIG. 1, and is subjected to a higher pressure, high temperature initial counter current filtration zone using a first solid/fluid separation device 12 as will be described in more detail below with reference to FIGS. 2 to 13. At this point, some biomass only requires squeezing of extractives and hemicellulose syrup and may not require wash water. In the solid/fluid separation device, liquid hemicellulose syrup and or extractives are removed with controlled cake thickness by the use of various screw elements. Permeability, pore size, filter area and pressure rating is controlled by using different filter plate designs, depending on the biomass type treated. Liquid pressure and flashing are controlled by the use of a pressure controlled flash tank 16.

Upon exiting the first solid/fluid separation device 12, the biomass is conveyed forward (to the right in FIG. 1) and heated with the use of steam/high pressure water from the forward area and pressure through compression/conveying with various screw elements is applied. In process stage 2 shown in FIG. 1, the biomass is subjected to high pressure mixing/kneading with variable shear energy for various biomasses to improve pre-treatment. High pressure, high temperature final counter current filtration (can only squeeze partial hemicellulose syrup and extractives and not counter current wash as required by some types of biomass) of liquid hemicellulose occurs with controlled cake thickness by the use of various screw elements. Permeability, pore size, filter area and pressure rating are controlled by selecting filter plates of appropriate design in a second solid/fluid separating device 14 depending on the biomass type treated. Liquid pressure and flashing is controlled by the use of a pressure controlled flash tank 16.

In process stage 3, the biomass is subjected to heat and pressure through compression/conveying with various different extruder screw elements. Shear energy is imparted to the biomass to improve enzyme accessibility as required to improve the pre-treatment of various biomasses. High pressure mixing/kneading of biomass with variable shear energy for various biomasses is used to improve pre-treatment. High pressure, high temperature mid-cycle (or final cycle, depending on biomass) can be imparted using counter or co-current filtration of liquid hemicellulose syrup with controlled cake thickness by the use of various screw elements. Permeability, pore size, filter area and pressure rating are controlled by selecting appropriate filter plates in a third solid/fluid separator 18 to suit biomass properties. Liquid pressure and flashing are controlled by the use of the pressure controlled flash tank 16.

In process stage 4 shown in FIG. 1, the biomass is subjected to heat and pressure through compression/conveying with various extruder screw elements. High pressure mixing/kneading of biomass with variable shear energy is selectable for various biomasses. In process stage 4, the biomass is mixed with high pressure water or other fluids/solutions for the final washing stage. Other fluids can include molecules, which are a gas at room temperature such as high pressure liquid $CO_2$, which will become super critical within the extruder due to higher temperature or ammonia which will be a high pressure gas.

The solid fibrous biomass is then conveyed under the highest pressure of the system through the second extruder 8 and one of the dynamic seal alternatives and exits under a controlled explosive decompression of compressed gases such as steam, ammonia or super critical fluids within the fibers at the outlet of the twin screw extruder into a solid/gas separating device (cyclone or other). When high pressure liquid $CO_2$ is used, the super critical nature of this fluid when it gets heated by the biomass permeates the internals of the solid fibers similar to a gas and results in a partial flow of the fluid upstream against the solids pressure profile just as a gas does. This super critical fluid within the fiber exerts an explosive force from within most fibers many times greater than a standard gas upon exiting the extruder through the dynamic seal, modifying the solid cellulose particles and thereby increasing enzymatic accessibility. Also at the discharge of the twin screw is an automatic control valve, which is used to keep the system somewhat pressurized should there be a loss of feed or power.

Exemplary Extruder Setup for Testing

An exemplary extruder setup was used to establish that the same principle setup of a separation device in accordance with the present disclosure and including a twin screw extruder in combination with a filter module can be used to process not only lignocellulosic biomass, but multiple other feedstocks. Those other feedstocks have very different consistencies than lignocellulosic biomass and in the past have been processed using very different separation devices and setups. The successful use of a single exemplary twin screw extruder device in accordance with the present disclosure for such diverse feedstocks illustrates the broad utility of the separation device concept of the present disclosure. The exemplary extruder had the basic twin screw extruder setup discussed further above. The extruder included an identical pair of cylindrical extruder screws of 25 mm diameter×1143 mm screw length (overall length 1290 mm), purchased from Harden Industries Ltd. (Guangzhou, China) and a barrel composed of 11 blocks, of which 7 were identical, solid barrel modules and 2 were filter modules, the construction of which will be detailed below. Filter module 1 was located in block 4&5 and filter module 2 was located in block 8&9. That means the barrel was 11 blocks long, with each block being 4" in length, and the filter modules each covered the length of 2 barrel blocks.

The extruder was driven by a 7.5 HP, 3-phase electric motor (Model 575 TEFC; totally enclosed fan cooled), purchased from Electrozad, (Chatham, Ontario, Canada) at a rotation speed of 40 rpm, which was about 5% of maximum speed. Each filter block included 480 alternating slotted filter plates and solid backer plates, which means 240 slotted filter plates and 240 solid backer plates. The filter plate thickness was 0.0050" and the support plate thickness was 0.020". Each filter plate included multiple slots (22) at a width varying from of 0.0150" to 0.163", resulting in a total open width at the core of 1.94" per plate (44.6% of core opening perimeter) and at total open area of 0.0097 square inch per plate. The overall length of the stack of 480 plates was 6" and the overall length of the filter block housing surrounding the stack of plates 8". The overall open area of each filter module was 2.328 square inch for a total open area of the filter modules in the extruder of 4.656 square inch. The porosity of each filter block was 8.9%.

Prior to processing different feedstocks in the extruder, the exemplary extruder was operated by feeding only water, in order to establish a base value for the load on the electric motor required to run the extruder in a no-load condition.

Example II

Feedstock Soybeans

Figure 16:
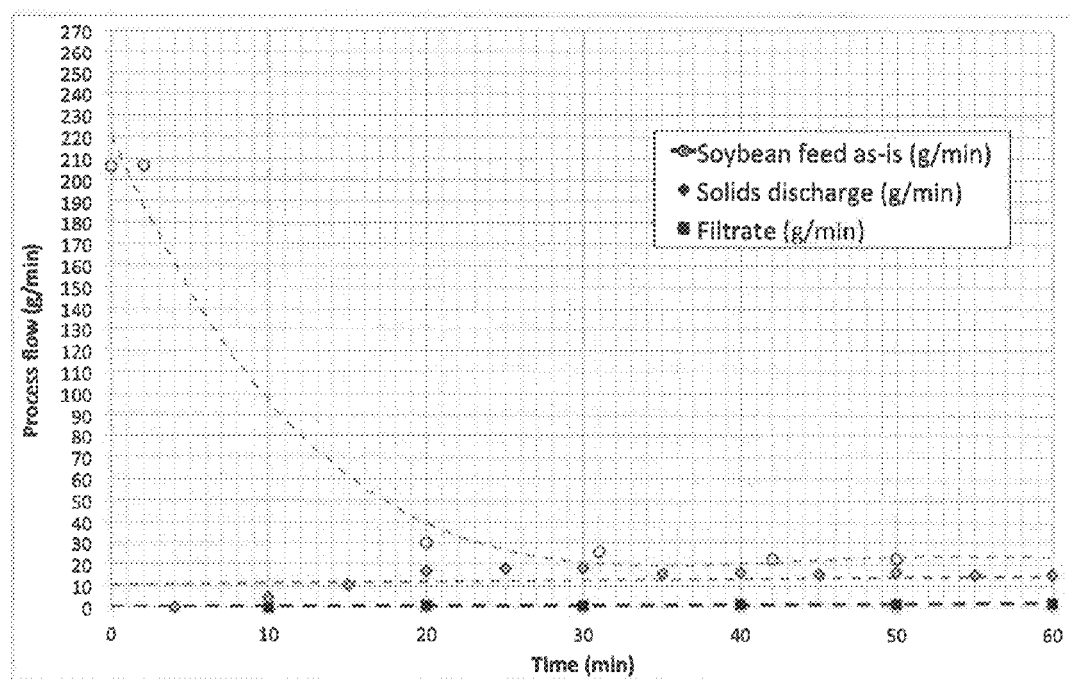
FIG. 16 illustrates the applicability of a separation device in accordance with the invention for the extraction of oil and water from macerated soybean feed stock.

Soybeans were sourced locally (grown in Chatham-Kent, Southern Ontario, Canada). Content analysis of the soybeans showed the feedstock was composed of 70.7%/wt solids and 29.3%/wt liquids, in the form of 13.8%/wt oil and 15.5%/wt water. The soybeans were fed whole into the extruder without pre-processing. The total amount of soybeans fed into the extruder was 1.384 kg whole soybean and the total operating time of the extruder was one hour. During extrusion of the soybeans, the motor load was 8 times higher than the baseline established with water. The feed rate, solids output rate and filtrate output rate over time are graphically illustrated in FIG. 16 As is apparent from the graph, the filtrate output is constant over the whole hour of operation, thereby indicating zero degree of clogging of the filter block. The overall output of the extruder was 11.5%/wt filtrate, with 5:95%/wt equal recovery through each of filter block #1 and #2, thereby indicating that the filtration rate of each filter block is independent of the relative solids content of the feedstock and that the overall filtration rate of the extruder is directly proportional to the number of filter blocks used. This also indicates that the overall filtration rate of the extruder could easily be increased by replacing more barrel blocks with filter blocks. The overall solids discharge was 88.5%/wt. The filtrate was composed of 55.1% oil, 0.4% suspended solids and 44.5% water, by weight and the solids discharge was composed of 8.4% oil, 79.9% solids and 11.7% water, by weight. This means 46.0% of the incoming oil in the olive oil feedstock was recovered in the filtrate, which translates into a yield of 6.3% soybean oil (w/w) from incoming soybean as-fed, or one liter of soybean oil per 14.5 kg of incoming soybean feedstock.

Example III

Feedstock Sugar Beets

Figure 15:
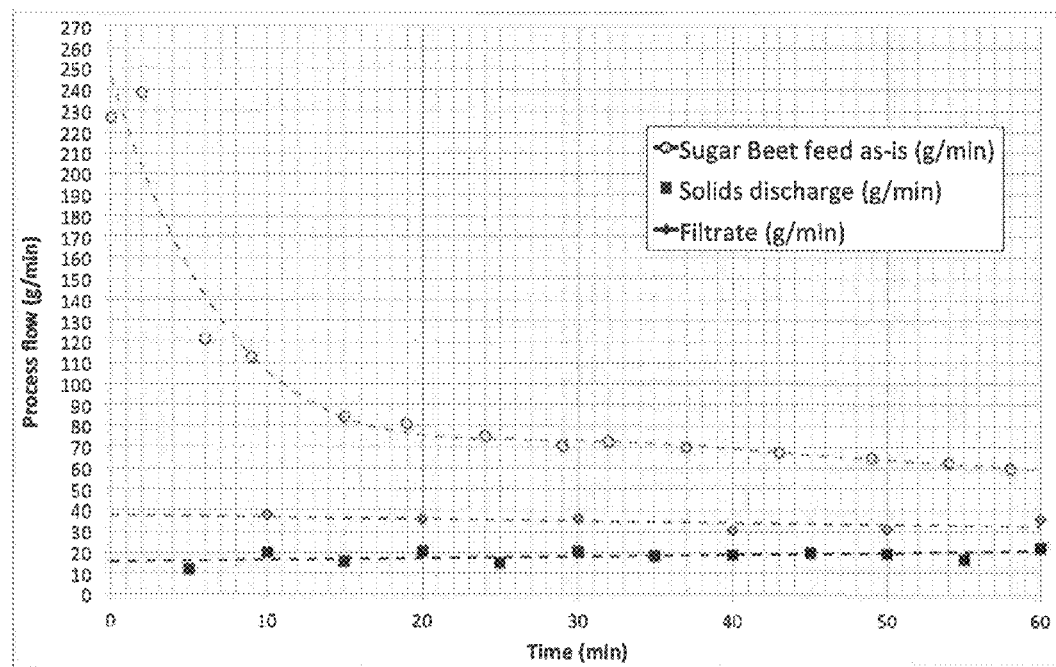
FIG. 15 illustrates the applicability of a separation device in accordance with the invention for the extraction of sucrose solution from sugar beets feed stock.

Sugar Beets were sourced locally (grown in Chatham-Kent, Southern Ontario, Canada). Whole sugar beets were received directly off the field after harvest and stored at an outdoor holding depot. Prior to processing, sugar beets required washing to remove debris (dirt, stones, etc.). A hand hatchet was used to split the sugar beets, then these sugar beet slices fed into a food processor using a first pass with the grating blades, followed by a second pass with the cutting blades. This produced a particle size of ~5 mm×5 mm biomass, which was suitable to be fed into the extruder. Content analysis of the sugar beets showed the feedstock was composed of 16.9%/wt sucrose, 1.4%/wt other soluble solids, 1.3%/wt insoluble solids, and 80.4%/wt water. The total amount of sugar beets fed into the extruder was 3.219 kg chopped sugar beets and the total operating time of the extruder was one hour. During extrusion of the sugar beets, the motor load was 25% higher than the baseline established with water. The feed rate, solids output rate and filtrate output rate over time are graphically illustrated in FIG. 15. As is apparent from the graph, the filtrate output is constant over the whole hour of operation, thereby indicating zero degree of clogging of the filter block. The overall output of the extruder was 66.2%/wt filtrate, with 40:60 recovery through filter modules #1 and #2, thereby indicating that the filtration rate is pressure dependent, but independent of the relative solids content of the feedstock and that the overall filtration rate of the extruder is directly proportional to the number of filter blocks and the separation pressure used. This also indicates that the overall filtration rate of the extruder could be increased by replacing more barrel blocks with filter blocks and/or by increasing the operating speed of the extruder to increase pressure. The overall solids discharge was 33.8%/wt. The filtrate was composed of 14.1% sucrose, 0.8% other soluble solids, 2.6% of suspended solids and 82.5% water, by weight and the solids discharge was composed of 22.4% sucrose, 2.4% other soluble solids, 1.7% of insoluble solids and 73.5% water, by weight. This means 55.2% of the incoming sucrose was recovered in the filtrate, which translates into a yield of 9.3% sucrose (w/w) from incoming sugar beet feedstock, or one kilogram of sucrose per 10.7 kg of incoming sugar beet feedstock.

Example IV

Feedstock Olives

Figure 14:
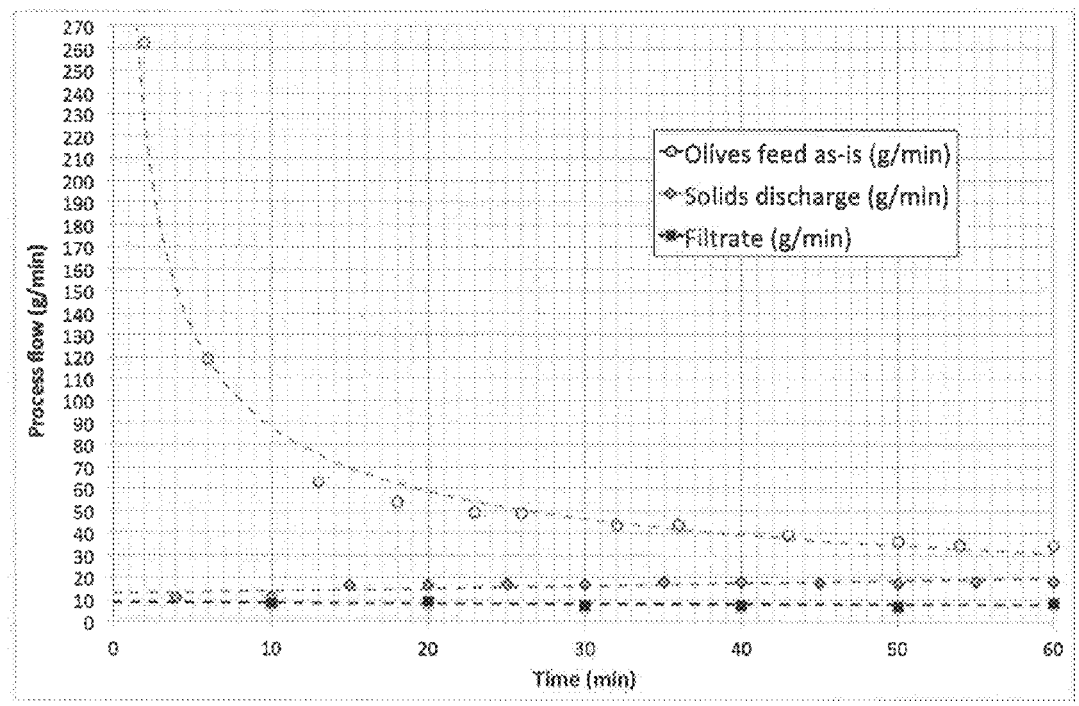
FIG. 14 illustrates the applicability of a separation device in accordance with the invention for the extraction of water and oil from olives feed stock.

Whole raw black olives were sourced from a distributor within the United States; not packed in water or oil. The olives received were pitted and pre-sliced. These pre-sliced olives were pre-processed further using a food processor to generate a ~5 mm×5 mm particle size. Content analysis of the resulting olives feedstock showed the feedstock was composed of 19.4% solids and 80.6%/wt liquids, dividing into 27.7%/wt oil and 52.9%/wt water. The total amount of feedstock fed into the extruder was 1.458 kg chopped olives and the total operating time of the extruder was one hour. During extrusion of the sugar beets, the motor load was similar to the baseline established with water. The feed rate, solids output rate and filtrate output rate over time are graphically illustrated in FIG. 14. As is apparent from the graph, the filtrate output is constant over the whole hour of operation, thereby indicating zero degree of clogging of the filter modules. The overall output of the extruder was 32.3% filtrate, with 20:80 recovery through filter modules #1 and #2, thereby indicating that the filtration rate is strongly pressure dependent, but independent of the relative solids content of the feedstock and that the overall filtration rate of the extruder is directly proportional to the number of filter modules and the separation pressure used. This also indicates that the overall filtration rate of the extruder could be increased by replacing more barrel blocks with filter modules and/or by increasing the operating speed of the extruder to increase pressure. The overall solids discharge was 67.7%/wt. The filtrate was composed of 50.9% oil, 4.1% suspended solids and 45% water, by weight and the solids discharge was composed of 16.6% oil, 26.7% solids and 56.6% water, by weight. This means 59.4% of incoming oil was recovered in the filtrate, which translates into a yield of 16.4% olive oil (w/w) from incoming olives feedstock, or one liter of olive oil per 5.5 kg of incoming olives feedstock. As mentioned above, increasing the yield can be achieved by adding filter modules, or increasing the operating pressure, but it is also possible to increase oil recovery from the feedstock by using solvents, for example hexane, the raise the level of oil recovery, which solvent can be admixed to the feedstock prior to feeding it into the extruder, or by injecting the solvent directly into the extruder during operation.

Example V

Feedstock Corn Cobs Pre-hydrolysate

Figure 17:
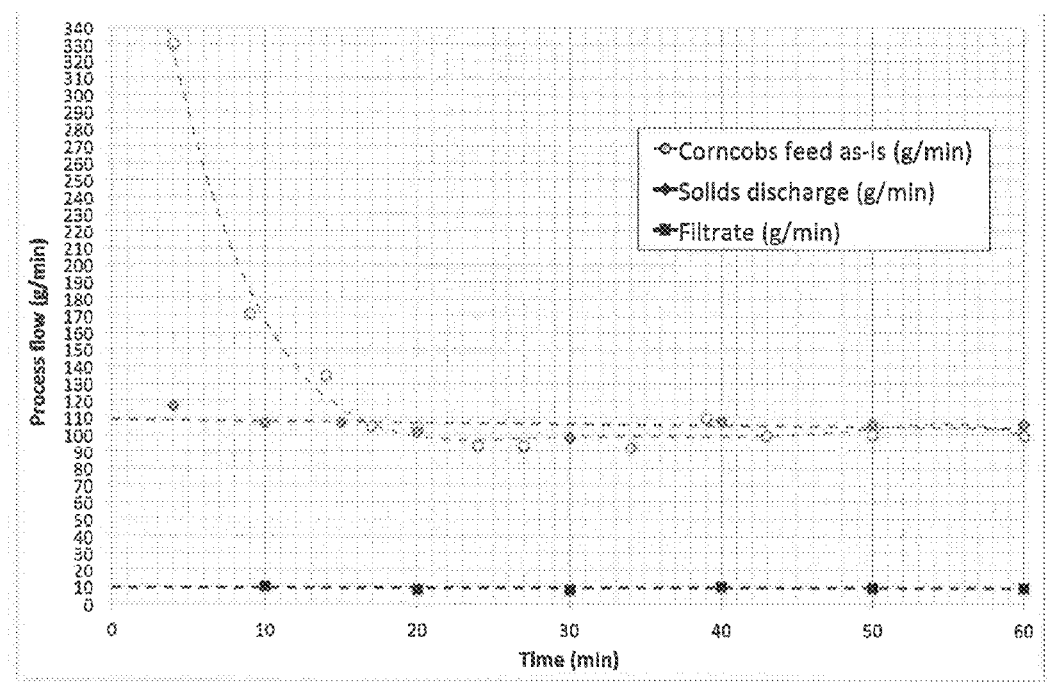
FIG. 17 illustrates the applicability of a separation device in accordance with the invention for the extraction of water from pretreated lignocellulosic biomass feed stock.

Corn cobs pre-hydrolysate was obtained by the process described in Example I. Content analysis of the feedstock showed the pre-hydrolysate was composed of 4.8%/wt hemicellulose, 6.8%/wt cellulose, 5.4%/wt other solids and 83%/wt water. The total amount of feedstock fed into the extruder was 7.025 kg and the total operating time of the extruder was one hour. During extrusion of the pre-hydrolysate, the motor load was 40% higher than the baseline established with water. The feed rate, solids output rate and filtrate output rate over time are graphically illustrated in FIG. 17. As is apparent from the graph, the filtrate output is constant over the whole hour of operation, thereby indicating zero degree of clogging of the filter modules. The overall output of the extruder was 8.0% filtrate, with 99:1 recovery through filter modules #1 and #2, thereby indicating that the filtration rate is strongly pressure dependent and possibly dependent on the relative solids content of the feedstock. It is expected that the filtrate recovery would be much higher at higher extruder pressures (higher rotating speed or different screw configuration). However, it is clear from the constant filtrate flow over the whole hour of operation, that the filter modules did not get clogged by the feedstock. This also indicates that the overall filtration rate of the extruder could be increased by replacing more barrel blocks with filter modules and/or by increasing the operating speed of the extruder to increase pressure. The overall solids discharge was 92%/wt. The filtrate was composed of 4.8% hemicellulose, 0.5% suspended solids (60:40 cellulose:other solids) and 94.4% water, by weight, and the solids discharge was composed of 4.7% hemicellulose, 13.3% solids (56:54 cellulose:other solids) and 82% water, by weight. This means 8.7% of incoming hemicellulose was recovered in the filtrate, which translates into a yield of one kilogram of hemicellulose sugars per 44.6 kg of incoming corncobs pre-hydrolysate feedstock. As mentioned above, increasing the yield can be achieved by adding filter modules, or increasing the operating pressure.

Further Applications/Feedstocks

The dewatering of pulp & paper slurries, Food slurries, fruit pulp (cider production) is presently limited and it is expected that the twin screw extruder separation apparatus of the invention will allow dewatering of these feedstocks to a level of 50 to 60% dry matter (DM) with cost effective energy usage.twin screw extruder separation apparatus of the present invention is also expected to allow the formation of bioenergy pellets from wet waste solids without the need for additional drying as it is expected to produce dry solids over 80% which then can go straight to pelletisation and minor final drying producing bioenergy pellets with very low energy.

In view of the currently observed versatility of the twin screw extruder separation apparatus of the present invention, it is expected that the apparatus will also be applicable for the dewatering of various mining tailings which are thixotropic. It is expected that water can squeezed out of these slurries with the apparatus of the invention before entering the tailings ponds. This would be environmentally advantageous and would save great amounts of storage capacity. An example of this would be the Solvay synthetic soda ash process tailings.

In view of the successful processing of soybeans and other feedstocks as discussed above, it is expected that the twin screw extruder separation apparatus of the present invention will also be applicable for the plant oil extraction from hemp, corn and many types of nuts and seeds through squeezing and pressing, with or without solvents.

In view of the successful processing of various feedstocks as discussed above, it is expected that the twin screw extruder separation apparatus of the present invention will also be applicable for the additional dewatering in a variety of food processing applications, such as tomato paste, tomato ketchup, potato starch processing, juices, and other pastes or jams.

Although this disclosure has described and illustrated certain embodiments, it is also to be understood that the system, apparatus and method described is not restricted to these particular embodiments. Rather, it is understood that all embodiments, which are functional or mechanical equivalents of the specific embodiments and features that have been described and illustrated herein are included.

It will be understood that, although various features have been described with respect to one or another of the embodiments, the various features and embodiments may be combined or used in conjunction with other features and embodiments as described and illustrated herein.

What is claimed is:

1. A solid/fluid separating apparatus for separating fluid from a mass of fluid containing solids, comprising
    a screw extruder press for pressurizing the mass of fluid containing solids, the extruder press including a barrel with an input end and an output end, and a core opening for receiving the mass of fluid containing solids, and two or more extruder screws having intercalated flightings over at least part of their length; and
    a filter unit for separating fluid from the pressurized mass, the filter unit being connected to the barrel for forming a continuation of the barrel and for receiving the pressurized mass and at least a portion of the twin screws;
    the filter unit including a filter pack consisting of a filter plate and a backer plate, the filter plate having an aperture shaped and sized equal to the core opening and a throughgoing filter slot extending away from the core opening and into the filter plate for directing fluid away from the core opening, and
    the backer plate also having an aperture shaped and sized equal to the core opening and the backer plate having a recess for defining, together with a back face of the filter plate, a drainage passage for guiding fluid collected in the filter slot to an exterior of the filter pack.

2. The apparatus of claim 1, wherein the filter plate includes a plurality of the filter slots.

3. The apparatus of claim 1, wherein the filter unit is connected to the barrel towards the output end of the barrel.

4. The apparatus of claim 1, wherein the filter unit has a plurality of the filter packs stacked back to back to form a filter block including a stack of alternating filter and backer plates and defining the core opening.

5. The apparatus of claim 1, wherein the filter unit has a preselected filter pore size and the filter slot defines an opening area corresponding to the preselected filter pore size.

6. The apparatus of claim 4, wherein the filter unit has a preselected filter pore size and a preselected porosity, each filter slot defining an opening area corresponding to the preselected filter pore size and each filter pack having a porosity calculated from a total surface of the core opening, the preselected filter pore size and the number of filter slots, the filter unit including a number of filter packs at least equal to preselected porosity/filter pack porosity.

7. The apparatus of claim 1, wherein the filter slot widens in a direction away from the core opening.

8. The apparatus of claim 1, wherein the filter unit includes a collection chamber having a pressure jacket for housing the filter pack, the pressure jacket being sealingly closed at an input end by an input end plate and at an outlet end by an outlet end plate, the filter pack being sandwiched between the input and outlet end plates.

9. The apparatus of claim 8, wherein the pressure jacket includes separate drains for liquids and gases.

10. The apparatus of claim 8, wherein the filter unit has a plurality of filter packs stacked back to back to form a filter block including a stack of alternating filter and backer plates sandwiched between the input and outlet end plates.

11. The apparatus of claim 9, wherein each filter plate includes a plurality of filter slots.

12. A solid/fluid separating apparatus, comprising
a. a twin-screw extruder press having an extruder barrel, and at least a pair of rotatable, intercalated extruder screws fittingly received in the extruder barrel; and
b. a separating module comprising
c. a pressurizable collection chamber connectable at an input end to the extruder barrel and having an outlet end; and
d. at least one filter pack in the collection chamber defining a core opening sealed from the collection chamber for communication with the extruder barrel, the filter pack including at least one filter plate having a throughgoing filter slot in fluid communication with the core opening and extending into the filter plate for directing fluids away from the core opening, and at least one backer plate for directing fluids collected in the filter slot into the collection chamber; and
e. the backer plate having a recess for guiding liquid in the filter passage into the collection chamber.

13. The apparatus of claim 12, wherein the collection chamber includes a pressure jacket, sealingly closed at an input end by an input end plate and at an outlet end by an outlet end plate, the input end, outlet end, filter and backer plates defining the core opening sealed from the collection chamber, for communicating with the extrusion barrel, the filter pack being sandwiched between the input and outlet end plates and the collection chamber having a drainage outlet for draining liquids separated by the filter pack.

14. The apparatus of claim 12, wherein the filter plate includes a plurality of the filter slots with a pore size of 0.00003 to 0.005 square inch.

15. The apparatus of claim 12, wherein the filter pack has a porosity of 5% to 40% measured as the total pore area relative to the total filter surface.

16. A solid/fluid separating apparatus for separating fluid from a mass of fluid containing solids, comprising
a screw extruder press for pressurizing the mass of fluid containing solids, the extruder press including a barrel with an input end and an output end, and two or more extruder screws having intercalated flightings over at least part of their length for conveying the mass of fluid containing solids towards the output end; and
a filter unit for separating fluid from the pressurized mass, the filter unit being connected to the barrel for forming a continuation of the barrel and for receiving the pressurized mass and at least an axial portion of the extruder screws;
the filter unit including at least a pair of stacked filter packs, each filter pack consisting of a filter plate having axial front and back surfaces and a backer plate stacked against one of the front and back surfaces of the filter plate,
the filter plate having an axially throughgoing aperture shaped and sized equal to the core opening and extending between the front and back surfaces and a filter slot for directing fluid away from the core opening, the filter slot extending axially through the filter plate between the front and back surfaces and radially from an intake end at the core opening to a closed end spaced from the core opening,
the backer plate also having an axially throughgoing aperture shaped and sized equal to the core opening and the backer plate axially closing the filter passage on the stacked-against front or back surface of the filter plate, and
the filter plate and backer plate in each filter pack together defining a drainage passage for guiding fluid collected in the filter slot to an exterior of the filter pack.

17. The apparatus of claim 16, wherein the filter plate includes a plurality of the filter slots.

18. The apparatus of claim 17, wherein the filter unit is connected to the barrel towards the output end of the barrel.

19. The apparatus of claim 16, wherein the filter unit has a plurality of the filter packs stacked back to back to form a filter block including a stack of alternating filter and backer plates and defining the core opening.

20. The apparatus of claim 16, wherein the filter unit has a preselected filter pore size and the filter slot defines an opening area corresponding to the preselected filter pore size.

21. The apparatus of claim 19, wherein the filter unit has a preselected filter pore size and a preselected porosity, each filter slot defining an opening area corresponding to the preselected filter pore size and each filter pack having a porosity calculated from a total surface of the core opening, the preselected filter pore size and the number of filter slots, the filter unit including a number of filter packs at least equal to a preselected porosity/filter pack porosity.

22. The apparatus of claim 16, wherein the filter slot widens in a direction away from the core opening.

23. The apparatus of claim 16, wherein the filter unit includes a collection chamber having a pressure jacket for housing the filter pack, the pressure jacket being sealingly closed at an input end by an input end plate and at an outlet end by an outlet end plate, the filter pack being sandwiched between the input and outlet end plates.

24. The apparatus of claim 23, wherein the pressure jacket includes separate drains for liquids and gases.

25. The apparatus of claim 21, wherein the filter unit has a plurality of filter packs stacked back to back to form a filter block including a stack of alternating filter and backer plates sandwiched between the input and outlet end plates.

26. The apparatus of claim 24, wherein each filter plate includes a plurality of filter slots.

* * * * *